United States Patent [19]
Lin et al.

[11] Patent Number: 6,061,512
[45] Date of Patent: May 9, 2000

[54] METHODS AND APPARATUS FOR CREATING AUTOMATED SERVERS FOR DISPLAY TELEPHONES

[75] Inventors: Steve Min-Chou Lin, East Brunswick; Chi-To Lin, Shrewsbury, both of N.J.

[73] Assignee: Global ADSI Solutions, Del.

[21] Appl. No.: 08/848,167

[22] Filed: Apr. 29, 1997

[51] Int. Cl.[7] ................................................. H04M 3/42
[52] U.S. Cl. .......................................................... 395/701
[58] Field of Search ................................... 345/333, 335; 379/201, 396; 395/701

[56] References Cited

U.S. PATENT DOCUMENTS

| | | | |
|---|---|---|---|
| 5,541,986 | 7/1996 | Hou | 379/201 |
| 5,615,257 | 3/1997 | Pezzullo et al. | 379/396 |

FOREIGN PATENT DOCUMENTS

| | | |
|---|---|---|
| 0 630 166A2 | of 0000 | European Pat. Off. . |
| 44 15 734 C1 | of 0000 | Germany . |
| 91/18483 | of 0000 | WIPO . |

OTHER PUBLICATIONS

"Generic Requirements for an SPCS to Customer Premises Equipment Data Interface for Analog Display Services," Technical Reference TR–NWT–001273, Issue 1, Dec. 1992.
"Customer Premises Equipment Compatibility Considerations for the Analog Display Services Interface", Special Report SR–INS–002461, Issue 1, Dec. 1992.
"Principle of Telecommunication Services Supported by a GSM Public Land Mobile Network" (GSM 02.01, ETSI, May 1994.
"General Requirement on Interworking Between the Public Land Mobile Network (PLMN) and the Integrated Services Digital Network (ISDN)" ETSI, Mar. 1995.
Digital Subscriber Signalling System No. 1 (DSS 1)—ISDN User–Network Interface Layer 3, Specification for Basic Call Control; ITU–T Recommendations Q–931, Mar. 1993.
"ISDN Access Call Control Switching and Signalling Requirements—Supplement 1", Bellcore Jun. 1990.
"Integrated Services Digital Network (ISDN); User–network Interface Layer 3; Specifications for Basic Call Control" ETSI, Dec. 1990.
"European Digital Cellular Telecommunications System (Phase 2); General on Terminal Adaptation Functions (TAF) for Mobile Stations (MS)" (GSM 07.01), ETSI, Sep. 1995.
"Specifications of Signalling Sysyem No. 7" Recommendations Q721–Q766, CCIT, Geneva 1986, pp. 221, 238, 239.

Primary Examiner—Tod R Swann
Assistant Examiner—Matthew Smithers
Attorney, Agent, or Firm—Burns, Doane, Swecker & Mathis, L.L.P.

[57] ABSTRACT

A development system for generating an automated server application program includes a server and a development tool. The server is responsive to a set of server control signals for providing a service to an expanded capability telephone via a telephone network, the service being in the form of signals that are exchanged with the expanded capability telephone. The development tool generates the set of server control signals, and operates by generating a set of graphical interfaces for displaying current service parameters to a developer, and receiving new values of the service parameters from the developer. A set of objects are provided in the development tool, each possessing predefined properties and exhibiting predefined behavior, whereby the set of objects defines the functionality of the development tool. The development tool modifies the set of objects in accordance with the new values of the service parameters, and generates the set of server control signals as a function of the modified set of objects. The development system may be adapted to operate in an environment in which the expanded capability telephone is an Analog Display Services Interface (ADSI)-compatible telephone, and the exchange of signals is in accordance with an ADSI protocol. In another aspect, the development tool permits modification of a first one of the objects in accordance with the new values of the service parameters. This information is then automatically channeled from the first object to another one or more of the objects.

27 Claims, 25 Drawing Sheets

SK Info for Project: C:\GLADSIS\SUNNY\APPS\APP1\APP1.PRJ　　　Page 1

NAME　LONG LABEL　　　S LABEL　MODE　SKT DEFINER (FD ONLY)
DONE　Done Entering　　　Done　　NORM　SDC
  DTMF...　B
  Encoded DTMF...　<From Input Buffer>
  Send Characters
  DTMF...　#

---

METHODS AND APPARATUS FOR CREATING AUTOMATED SERVERS FOR DISPLAY TELEPHONES

BACKGROUND

The present invention relates to data communications and telecommunications, more particularly to automated services that may be provided to telephone and computer users via a telephone network, and even more particularly to techniques for creating such automated services.

It is known to provide various types of automated services to telephone users. A user may access such services merely by placing a telephone call to an automated server. Upon establishment of a connection, the automated server may prompt the user with pre-recorded voice messages (e.g., "If you would like to listen to information about traffic conditions, press 3"). The user makes selections by pressing one or more appropriate keys on the telephone, which causes dual tone multi-frequency (DTMF) tones to be transmitted to the automated server. Operation of the automated server is then performed in response to which DTMF tones were received.

In order to improve the quality and variety of automated services that may be offered, a number of manufacturers now make and sell telephones having expanded input and output capabilities. An example is illustrated in FIG. 1. In this example, an expanded capability telephone 101 is coupled to an automated server 105 by means of a public switched telephone network (PSTN) 103. The automated server may be an application program running on a general purpose digital computer, or alternatively may be a hard-wired (i.e., non-programmable) device.

The expanded capability telephone 101 includes not only a standard numerical keypad 107 and handset 109, but also a screen 111 for displaying visual information, and a number of so-called "softkeys" 113. Information to be displayed on the screen 111 is transmitted from the automated server 105 to the expanded capability telephone 101 via the PSTN 103.

The softkeys 113 are termed that because their function is determined by the automated server 105 and executed by the expanded capability telephone 101 when the softkey 113 is activated by a user. The programs for the softkeys 113 may typically be downloaded from the automated server 105 by means of the PSTN 103. One example of a possible softkey function is to move the position of a selection cursor that is currently being displayed on the screen 111. Another one of the softkeys 113 might be programmed to send a DTMF-encoded message to the automated server 105, indicating the present screen location of a selection cursor (and thereby indicating which of a number of displayed selection possibilities has been selected by the user).

In order for the above-described system to be operational, it is necessary for the automated server 105 and the expanded capability telephone 101 to use a mutually agreed-upon protocol for the transmission of information through the PSTN 103. Where a manufacturer makes both the automated server 105 and the expanded capability telephone 101, the protocol can be defined on an ad hoc basis. However, in order to promote the widespread development of automated services, and to permit automated servers 105 developed by one manufacturer to operate with expanded capability telephones 101 developed and made by a different manufacturer, a standardized protocol is needed. One such standard protocol, called the Analog Display Services Interface (ADSI), has been defined by Bellcore, and described in the following documents which are hereby incorporated by reference herein: Bellcore FR-12 "ADSI Guide", 1994, including: Bellcore TR-NWT-001273, "Generic Requirements for an SPCS to Customer Premises Equipment Data Interface for Analog Display Services"; Bellcore TR-NWT-000030, "Voiceband Data Transmission Interface Generic Requirements"; Bellcore SR-INS-002461, "Customer Premises Equipment Compatibility Considerations for the Analog Display Services Interface"; Bellcore SR-TSV-002476, "Customer Premises Equipment Compatibility Considerations for the Voiceband Data Transmission Interface"; Bellcore SR-TSV-002697, "An Encryption Capability for the Analog Display Services Interface"; Bellcore SR-NWT-002495, "Guidelines for Writing Applications Which Use the ADSI for Data Communications"; Bellcore SR-TSV-002578, "A Method and Apparatus for Detecting a Dual Tone Signal in the Presence of Speech"; Bellcore SR-INS-002726, "Classes of Customer Premises Equipment"; Bellcore SR-NWT-003004, "Testing Guidelines for Analog Type 1, 2 and 3 CPE"; and SR-3034, "ADSI Script Management".

One aspect of the ADSI standard is the definition of the Customer Premises Equipment (CPE), which is an abstract expanded capability telephone having a screen (for displaying a title, information and overwritable user input fields), a keypad, and six softkeys.

The ADSI protocol, then, defines the way voice and data will be communicated over an existing analog telephone network between an automated server 105 and an expanded capability telephone 101 that supports the features and functions that have been defined for the CPE. In addition to real-time interactive applications (using an ADSI capability called "Server Display Control" or SDC), an ADSI capability called "Feature Download" also enables a program to be downloaded from an automated server 105 to the CPE-compatible expanded capability telephone 101. The downloaded program (often referred to as a "script") is run (interpreted) on the expanded capability telephone 101, and remains resident in the expanded capability telephone 101 until it is erased by the user. The Feature Download capability permits a telephone company to download a call management (telephony) script tailored to an individual's service subscription. As a result, the individual can activate services such as three-way calling, call waiting, call forwarding and the like through context sensitive screen prompts and softkeys.

An example of a feature that can be implemented by means of an advanced call management telephony script is a service which, in some regions, is called "Call Waiting Deluxe". Call Waiting Deluxe lets a user know who is calling when call waiting is activated. In addition, operation of one of a number of push buttons allows the user to:

switch to the new call;

add the new call (i.e., conference call);

forward the new call to the user's voice mail;

put the new caller on hold with a hold announcement and music;

play back a busy message telling the new caller to call back later; or drop the current call and switch to the new call.

The use of feature download scripts and SDC may provide such applications as visual voice mail, electronic white pages (directory service), home shopping, and restaurant menu ordering. This list is not intended to be exhaustive, but merely illustrative of the types of applications that can be created for an expanded capability telephone 101.

As mentioned above, the use of ADSI-based services conventionally requires that the user have an ADSI-capable device. Such devices have been made in the form of screen phones, personal digital assistants (PDAs), pagers, ADSI-capable personal computers (PCs), and even television set-top boxes that permit a call to be made by means of a television set.

Creating applications for an automated server 105 is no simple matter, because ADSI is a complex protocol with many detailed requirements that must be followed. As a result of ad hoc development techniques, new applications for automated servers 105 may be slow to come to market. Therefore, it is desirable to provide techniques and tools for simplifying the automated server application development process.

SUMMARY

It is therefore an object of the present invention to provide techniques and tools for creating an automated server.

It is a further object of the present invention to provide a techniques and tools for creating an ADSI-based automated server.

The foregoing and other objects are achieved in a development tool for generating a set of server control signals for controlling a server that provides a service to an expanded capability telephone via a telephone network, wherein the service comprises an exchange of signals with the expanded capability telephone. The expanded capability telephone may be, for example, an Analog Display Services Interface (ADSI)-compatible telephone, and the exchange of signals is, in this case, in accordance with an ADSI protocol.

In one aspect of the invention, the development tool operates by displaying current service parameters to a developer, and receiving new values of the service parameters from the developer. This input/output function may be performed by a graphical user interface. The development tool further includes a set of objects (e.g., software created objects), each possessing predefined properties and exhibiting predefined behavior, whereby the set of objects defines the functionality of the development tool. The properties and behavior relate to various aspects of the expanded capability telephone, and to various operations to be performed by the server in the course of providing the service. The development tool modifies the set of objects in accordance with the new values of the service parameters, and generates the set of server control signals as a function of the modified set of objects.

In another aspect of the invention, the server comprises a script interpreter and a runtime engine, wherein the script interpreter converts a script file into runtime control signals for controlling the runtime engine, and wherein the runtime engine, under direction of the runtime control signals, provides the service to the expanded capability telephone. In this case, the step of generating the set of server control signals comprises generating the script file for controlling the script interpreter as a function of the modified set of objects.

In still another aspect of the invention, the step of modifying the set of objects comprises the steps of modifying a first one of the objects in accordance with the new values of the service parameters, and then having the development tool channel information from the first one of the objects to another one or more of the objects.

In yet another aspect of the invention, a development system is provided that includes not only a development tool incorporating some or all of the features mentioned above, but also a server. This is useful for providing an environment in which services under development may be tested by the developer before being made available to a user of the expanded capability telephone.

In still another aspect of the invention, a development tool incorporating some or all of the features mentioned above may be embodied as computer readable program code means. This may, for example be computer readable program code stored magnetically on a magnetic storage medium (e.g., a diskette) or stored as reflection characteristics on a CD ROM.

BRIEF DESCRIPTION OF THE DRAWINGS

The objects and advantages of the invention will be understood by reading the following detailed description in conjunction with the drawings in which.

DETAILED DESCRIPTION

Figure 1:
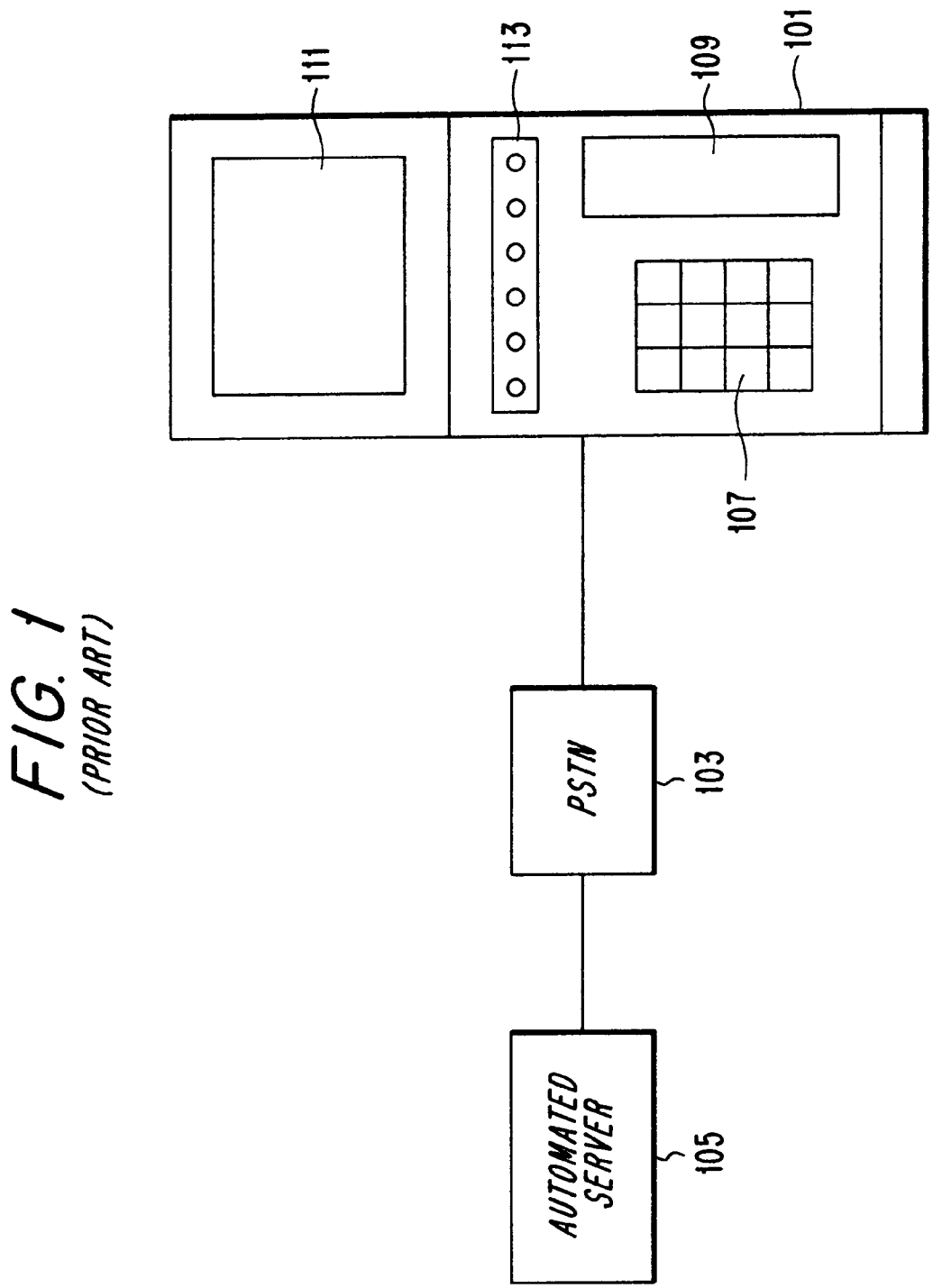
FIG. 1 is a block diagram of a conventional system including an automated server and an expanded capability telephone.

The various features of the invention will now be described with respect to the figures, in which like parts are identified with the same reference characters.

The invention provides a development platform that makes it possible for a developer to create an automated server 105 without having to be concerned with all of the details of the protocol (e.g., ADSI) that is to be used between the automated server 105 and the expanded capability telephone 101. The automated server 105 provides a service to a user of the expanded capability telephone 101. The service is physically manifested as an exchange of signals between the automated server 105 and the expanded capability telephone 101. The selection of signals to be exchanged is a function of inputs received from a user of the expanded capability telephone 101, and of control logic within the automated server 105. The invention will be described with respect to an exemplary embodiment that is depicted in FIG. 2.

Figure 2:
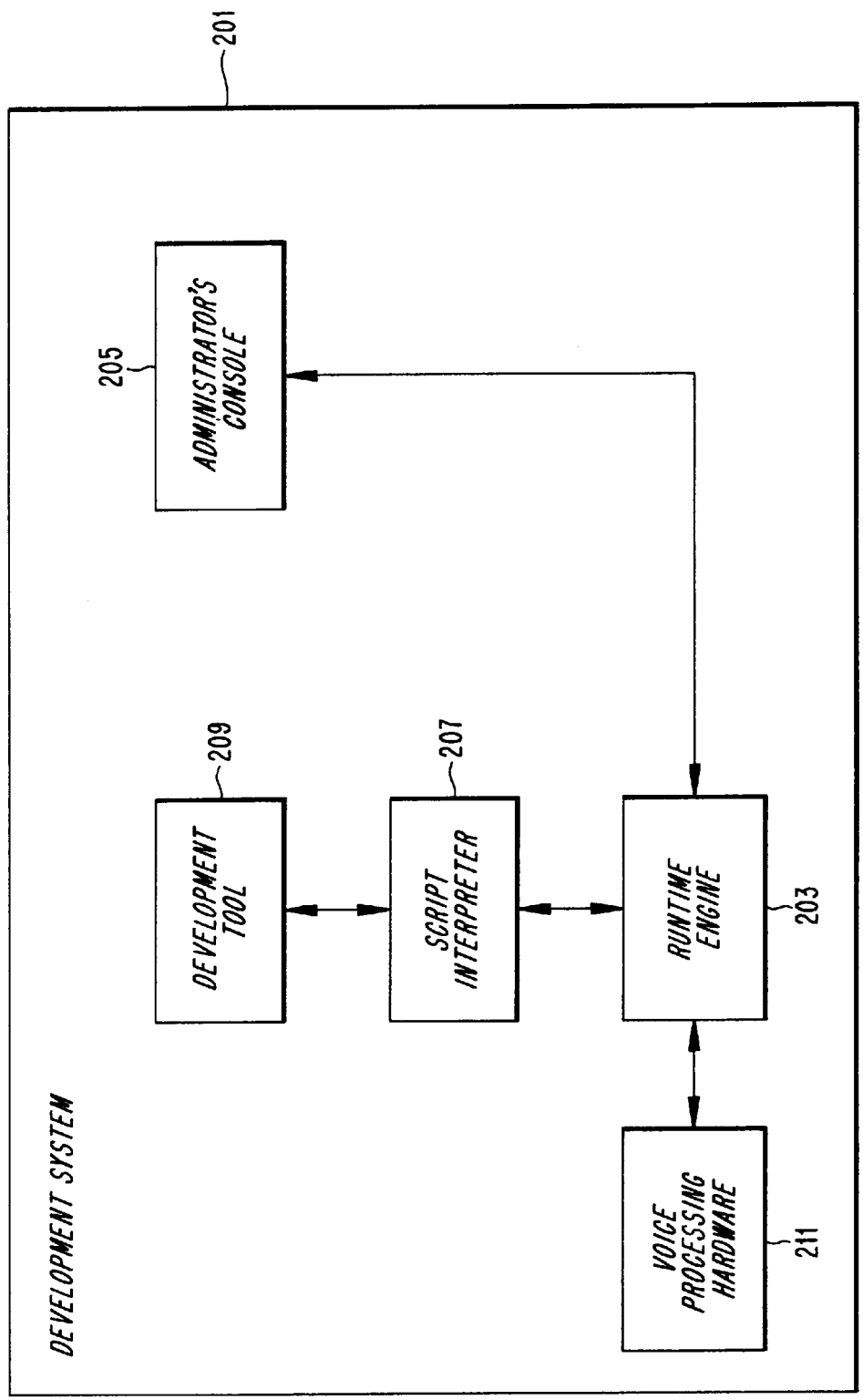
FIG. 2 is a block diagram of an exemplary embodiment of a server development system in accordance with one aspect of the invention.

Referring now to FIG. 2, a development system 201 is shown. The development system 201 supports all ADSI features and is preferably implemented on a computer that runs an operating system having multi-process/multi-thread capabilities, such as the WINDOWS NT operating system. The development system 201 is preferably architected to make optimal use of the multi-process/multi-thread capabilities, robust networking and security features, and real-time environment.

Each development system 201 is preferably a computer running software that may be logically partitioned into a number of components. At the heart of the system is a runtime engine 203 that provides a robust and reliable runtime environment for screen/voice-based applications. Each voice channel is handled by a multi-threaded process in the runtime engine 203 which ensures localization of errors in the event of an application failure.

Figure 4:
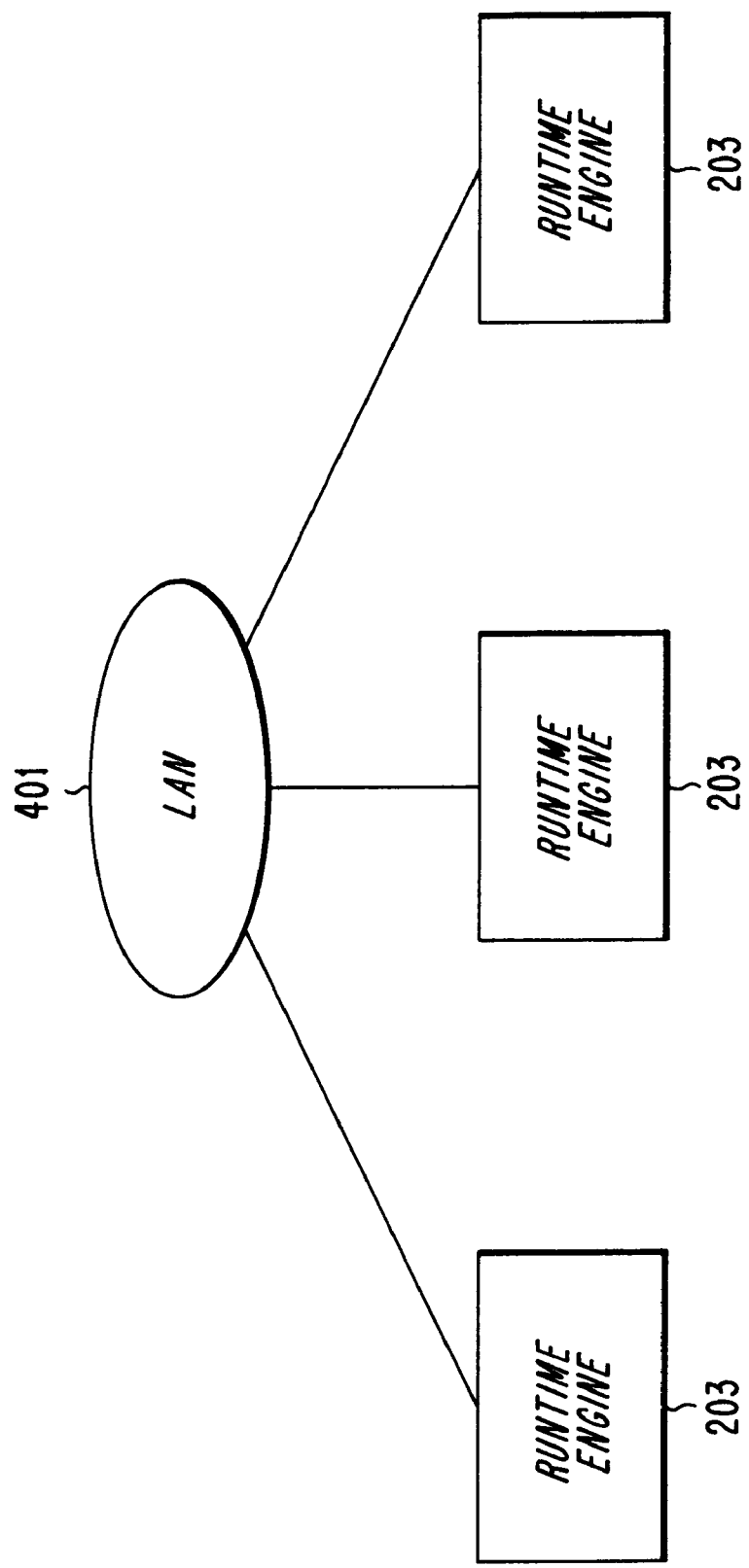
FIG. 4 depicts interconnection of a number of development systems via a Local Area Network in accordance with an aspect of the invention.

Another component of the development system 201 is an administrator's console 205, which is a separate process that monitors channel status and process errors. The administrator's console 205 is a means for providing full features of system monitoring, operation and maintenance support. For the case of multiple systems (as illustrated in FIG. 4), administration can be done alternatively through a single local console, remote console connected through data network, or remote console connected through a modem dial-up line.

The runtime engine 203 is coupled to a script interpreter 207. The function of the script interpreter is to receive a script file (e.g., from a development tool 209), and interpret it, line by line, to generate control signals for controlling the operation of the runtime engine 203. It is the function of the runtime engine 203 to effect the desired application (e.g., automated server) based on the control signals provided by the script interpreter 207. More specifically, the runtime engine 203 sends and receives messages to and from the script interpreter 207. When the runtime engine 203 receives events from voice processing hardware 211, messages about these events are supplied to the script interpreter 207. In response, the script interpreter 207 sends return messages (i.e., commands) to the runtime engine 203 which cause the runtime engine 203 to instruct the voice processing hardware 211 to process these commands. For example, the script interpreter 207 may ask the runtime engine 203 to send a screen to an ADSI screen phone. The runtime engine 203 will then format the screen according to the ADSI protocol format and pass the information to the voice processing hardware 211 for sending frequency shift keying (FSK) data.

In alternative embodiments, the script interpreter 207 and runtime engine 203 are not logically separated from one another, and are incorporated into a single unit, herein designated as "server" (not shown), that receives a set of control signals (e.g., in the form of a script file as described above) from the development tool 209, and provides a service to the extended capability telephone 101 as a function of the control signals.

Figure 3:
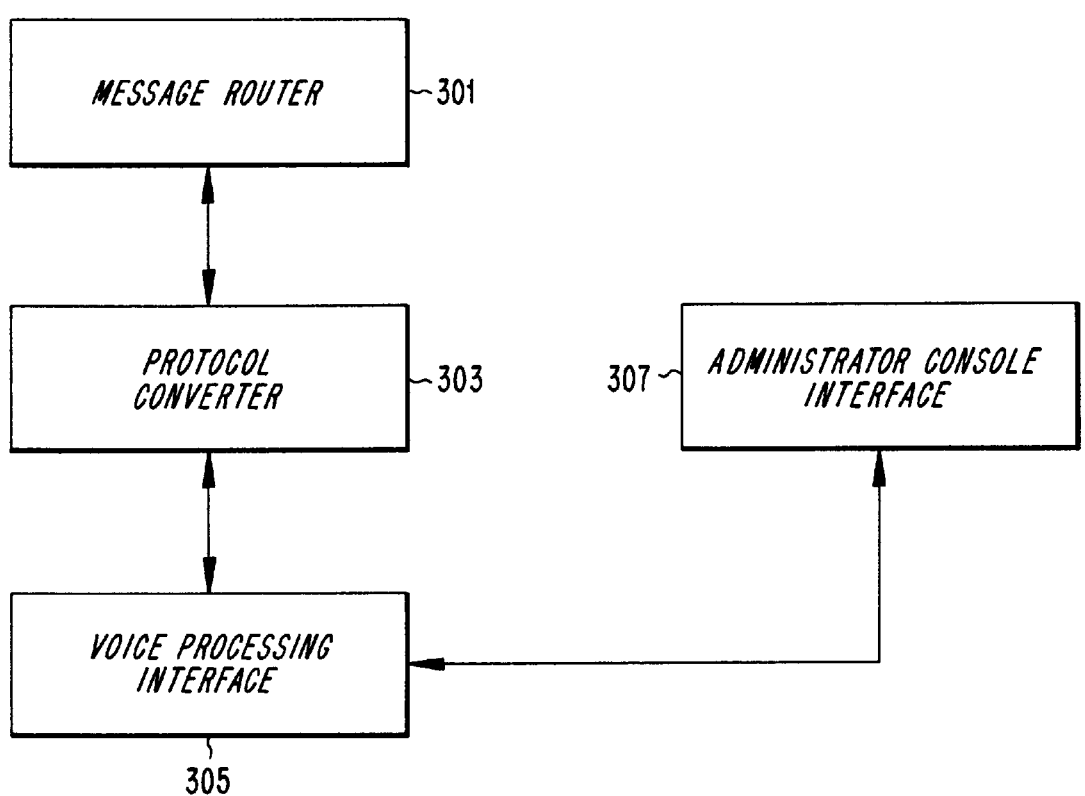
FIG. 3 is a block diagram depicting the runtime engine in greater detail.

Returning now to the discussion of the exemplary embodiment, the runtime engine 203 is depicted in greater detail in FIG. 3. The runtime engine 203 includes a message router 301 coupled to a protocol converter 303. The protocol converter 303 is further coupled to a voice processing interface 305. The runtime engine 203 further includes an administrator console interface 307 coupled to the voice processing interface 305. In operation, the message router 301 exchanges messages between the script interpreter 207 and the protocol converter 303. The protocol converter 303 converts script interpreter messages into ADSI data format data that is passed along to the voice processing interface 305. The administrator console interface 307 passes the states (e.g., on-hook, off-hook) of voice processing hardware 211 to the administrator's console 205, where it can be displayed to a user. The voice processing interface 305 instructs voice processing hardware 211 to send FSK data to the ADSI screen phone.

A number of runtime engines 203 may be interconnected via a Local Area Network (LAN) 401 so that, as a system grows, service providers can add more runtime engines 203 to the LAN 401. This is illustrated in FIG. 4. Each runtime engine 203 utilizes its own voice processing hardware for call processing, voice processing and ADSI signaling and data processing. Each runtime engine 203 can be configured to interface to the telephone network through analog loop start, integrated services data network (ISDN), or digital T1/E1 lines. The system configuration and architecture are fully scaleable and easily engineered to support a virtually unlimited number of ports. Hardware and software redundancy is ensured by the modular and distributed nature of the system architecture shown in FIG. 4.

Figure 5:
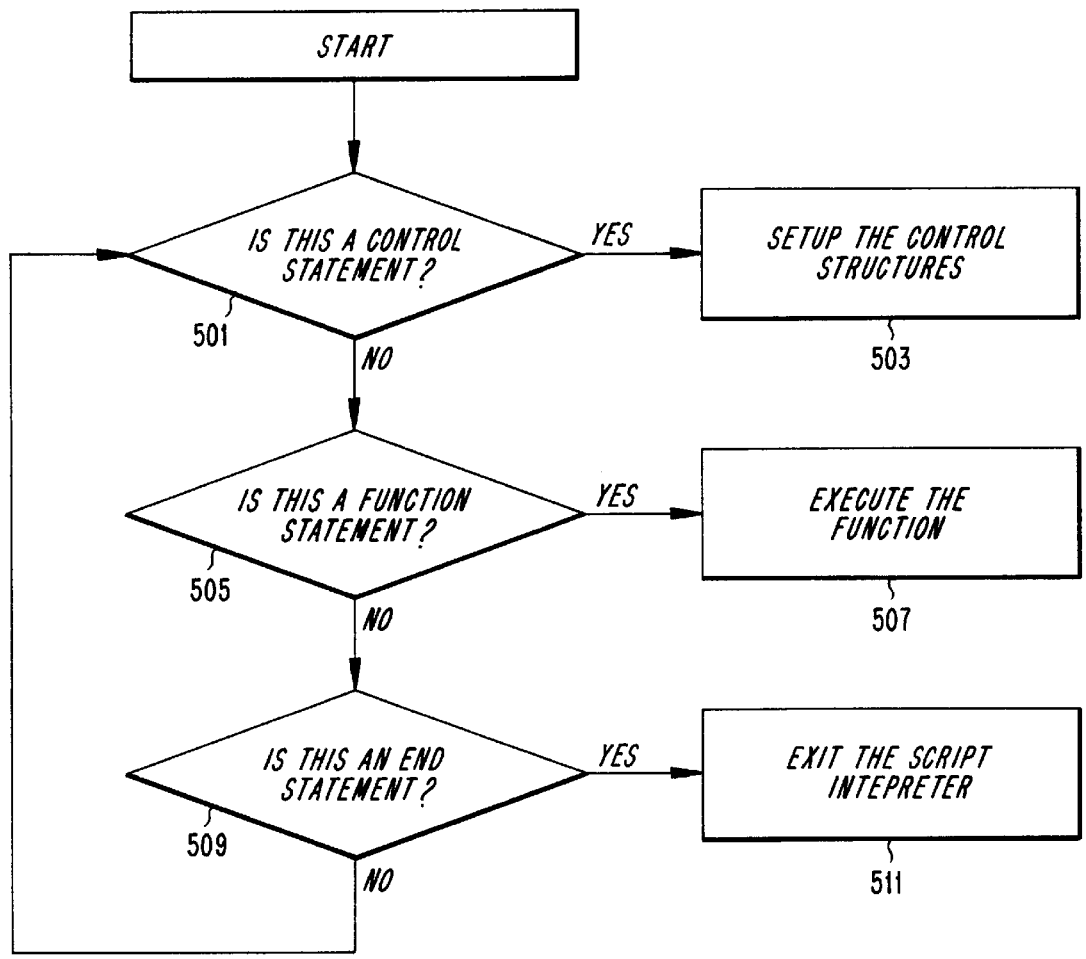
FIG. 5 is a flowchart depicting an exemplary embodiment of a script interpreter in accordance with an aspect of the invention.

Turning now to the script interpreter 207, an exemplary embodiment of its overall operation is depicted in the flowchart of FIG. 5. For each line in a script file, the script interpreter 207 first determines whether the line represents a control statement (step 501). If it does, then the indicated control structures (e.g., "if-then-else", "do-while" "for-next") are set up (step 503).

If the line is not a control statement, then the script interpreter 207 determines whether the line is a function statement (step 505). A function statement is one that designates a non-program flow control operation to be performed. If it is, then the script interpreter executes the function (step 507).

If the line is not a function statement, then the script interpreter 207 determines whether the line is an END statement (step 509). If it is, then operation of the script interpreter is complete (step 511). Otherwise, the line should be ignored (e.g., it is a blank line or a comment line), so execution begins back at step 501.

Selection of a script to be executed may be based on the occurrence of a corresponding event. For example, the following is an exemplary application script profile:

//script state predicate, event, forward code predicate, script file
0 RINGING_RECEIVED 0 \ . . . [DIRECTORY PATH] . . . \RINGING.SCP
0 GOING_OFFHOOK 0 \ . . . [DIRECTORY PATH] . . . \OFFHOOK.SCP When a ringing event occurs, the script identified as "ringing.scp" (in the indicated subdirectory) will be executed. Similarly, when an off-hook event occurs, the script identified as "offhook.scp" (in the indicated subdirectory) will be executed. A script state variable can be set by a script. For any given line in a script profile, the indicated script file will be executed if it is true that the indicated event has occurred and the current script state matches the script state predicate. An exception to this rule occurs if the script state predicate is set to 0, in which case the indicated script will be executed whenever the indicated event occurs, regardless of what the current script state is.

In a running system, a forward code may be passed from the network to indicate why a call has been forwarded to the runtime engine 203. Such reasons may include, for example, the fact that a called number that had been direct-dialed by a caller is presently busy. The script profile may also include a parameter corresponding to a forward code predicate. When an event occurs that matches an indicated event on a line in the script profile, the indicated script will be executed if the received forward code matches the forward code predicate. However, by setting the forward code predicate equal to 0 on a given line in the script profile, execution of the script file indicated on that line can be made to happen whenever an occurring event matches the indicated event regardless of whether the actual forward code matches the forward code predicate.

The following is a sample script (lines beginning with "//" are comment lines):

```
//Define a screen object
Screen scr1
//Define softkey objects
Softkey sk1, sk2
//Define information line objects
Infoline info1, info2
//Specify a screen file
SetScreenAttr scr1 FileName="scr\main.scr"
//Define the attributes of a softkey
SetSoftkeyAttr sk1 LongLabel="Softkey 1" ShortLabel="Sk1"
SetSoftkeyAttr sk2 LongLabel="Softkey 2" ShortLabel="Sk2"
//Define the attributes o an information line
SetInfoLineAttr info1 Primary="Added line2 Pri" Secondary=
"Added line 2 Sec"
SetInfoLineAttr info1 Softkey1=sk1 Softkey2=sk2
//Add Information line to a screen
AddInfoline scr1 info1
SetInfolineAttr info2 Primary="Added line3 Pri" Secondary=
"Added line3 Sec"
AddInfoline scr1 info1
//Send the screen to an ADSI screen phone
SendScreen scr1 2
//Ask the voice processing hardware to send the screen
FlushBuffer
//Debugging statement
Print "Deleting line3"
//Delete an information line
DeleteInfoline scr1 3
SendScreen scr1
FlushBuffer
Hangup
End
```

Turning now to the administrator's console 205, it provides administration and operation facilities for the runtime engines 203. For example, the administrator's console 205 displays the states of voice processing hardware (e.g., On-hook state, Off-hook state) and the cumulative number of calls the voice processing hardware has received. These facilities enable a system administrator to perform daily operation functions on maintaining the runtime engine 203 and applications. Multiple development systems 201 can be monitored from a single administrator's console 205. The administrator's console 205 can be run locally at a local console and/or remotely via a wide area network connection. Multiple administrator's consoles 205 can be connected to the same set of runtime engines 203 for multi-location/multi-personnel system operation/monitoring.

Exemplary tasks performed by the system administrators using the administrator's console 205 include:

Channel Status Monitoring

Launching Applications

Stopping Applications

Application Portfolio Management

Dialed Number Identification Service (DNIS) Router Configuration

Responding to Alarm Messages

The discussion will now focus on the development tool 209, which is used for creating applications in the form of script files that may be supplied to the script interpreter 207 for execution. The development tool is preferably implemented by means of an object-oriented programming language, such as Powerbuilder in combination with the C programming language. This is not a requirement, however, because those having ordinary skill in the art will recognize that the inventive concepts described here may be applied to a wide variety of programming implementation techniques. Furthermore, the development tool may be embodied as computer readable program code means, such as computer readable program code stored magnetically on a magnetic storage medium (e.g., a diskette) or as reflection characteristics on a CD ROM. Still further, the exemplary embodiment assumes that a service user will be utilizing an ADSI-compatible telephone (or comparable Customer Premises Equipment (CPE)). However, the inventive concepts taught here could easily be applied to other protocols as well.

The purpose of the development tool 209 is to provide a mechanism for an application developer to create an application (e.g., the automated server 105) without having to be concerned with the details of the underlying protocol (e.g., ADSI) by which the application will be carried out.

Figure 6:
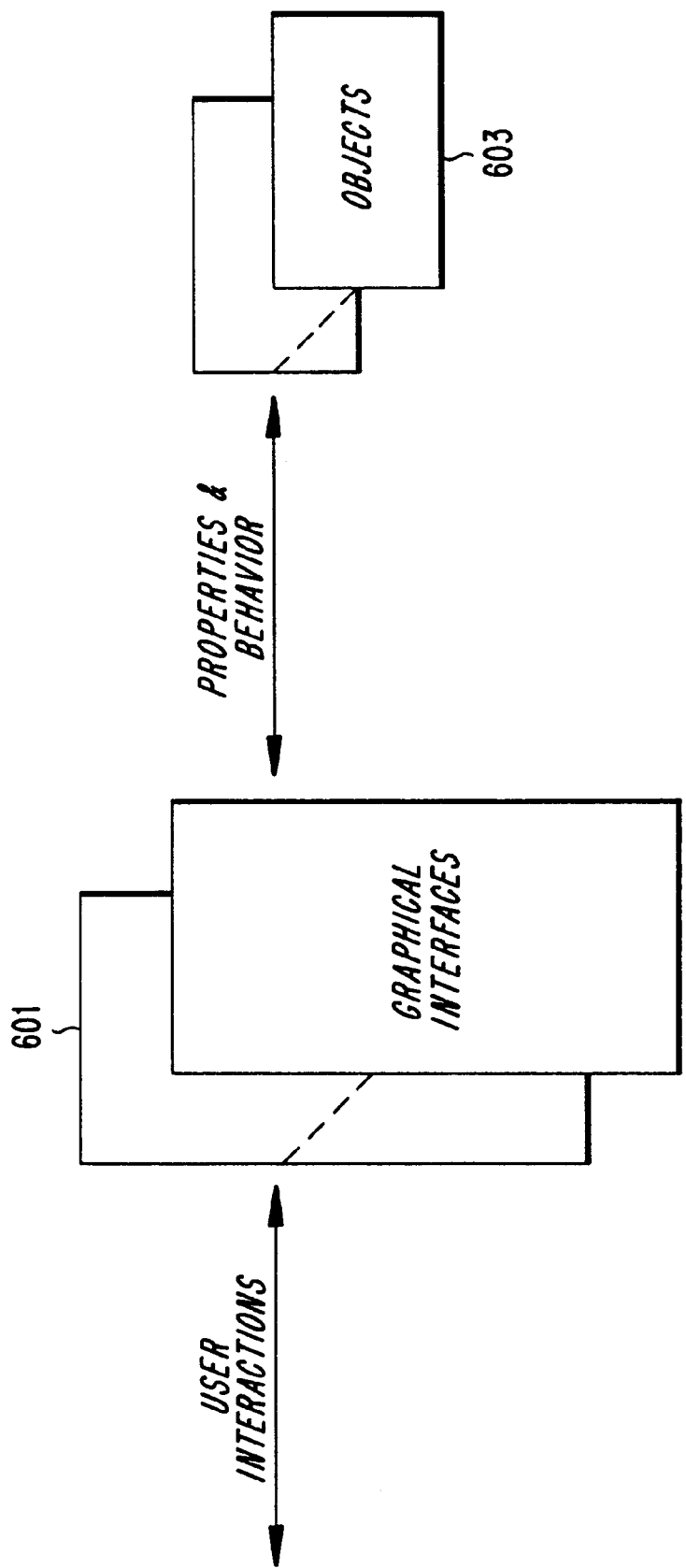
FIG. 6 is a diagram depicting the interactive relationship between graphical interfaces and objects, in accordance with an aspect of the invention.

In accordance with one aspect of the invention, the development tool 209 includes a set of software-defined objects. Each object by itself possesses distinct properties and exhibits predefined behavior that, when considered in conjunction with all of the different types of objects, completely defines the functionality of the application development environment. In another aspect of the invention, each object is represented by one or more graphical interfaces. These graphical interfaces are the means by which application developers interact with the objects during application development. This arrangement is illustrated in FIG. 6. A number of objects 603 internally represent corresponding aspects of all possible applications (e.g., softkey settings and screen displays on the expanded capability telephone 101, and voice prompts and logic that are invoked by the runtime engine 203). Each of the objects 603 has one or more corresponding graphical interfaces that permit an application developer to determine present settings and enter new ones.

Thus, the graphical interfaces 601 provide an easy-to-use environment for rapid application development. These graphical interfaces 601 represent the properties and behavior of the objects and in so doing, allow developers to focus solely on the development of applications instead of having to be concerned with all of the details of the given protocol (e.g., the ADSI protocol). This approach greatly reduces the chance for human errors in application development because it imposes proper limitations on the user's interactions and also because the development tool 209 further performs cross checking of objects' properties, behavior and interactions.

In another aspect of the invention, the development tool 209 additionally performs an information channeling function, in which data specified by a developer for one object is also made available to corresponding other objects. This may be performed by special routines in the development tool 209 that identify when newly provided data for one object needs to be made available (e.g., by providing a reference or pointer) to one or more other objects, and then makes the necessary associations.

Information to be channeled starts with default values or behavior of each object. Information created in each object is then channeled to other related objects. This enables the presentation of context sensitive information throughout the graphical interfaces. For example, softkey information created using the graphical softkey object interface is channeled through to the screen object and script object graphical interfaces. This is helpful to the developer because softkey information is critical in constructing the screen and script objects.

Figure 7:
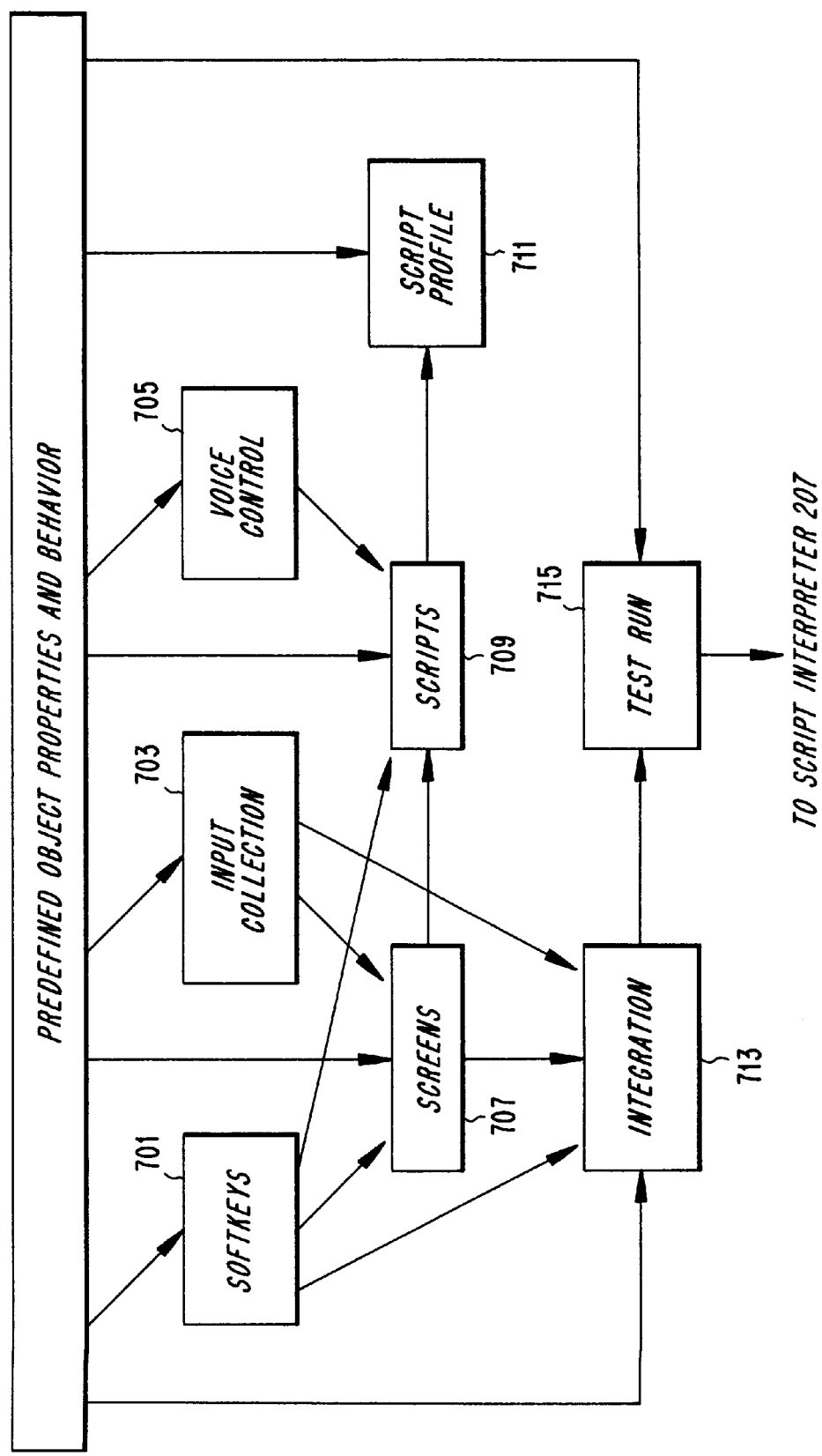
FIG. 7 depicts an exemplary list of objects for an ADSI-based application development system, and also shows the channeling relationship between these objects, in accordance with an aspect of the invention.

FIG. 7 depicts an exemplary list of objects for an ADSI-based application development system, and also shows (by means of arrows in the figure) the channeling relationship between these objects. The objects are as follows:

Softkeys 701: Softkeys are action keys that application users press to perform an action predefined by the application. Softkeys attributes include labeling information for conveying the meaning of the softkeys to the users, and softkey action definitions.

Voice Controller 705: The voice controller provides the management of application voice prompts, such as creation of voice prompts and specifications of voice prompt properties, such as storage location, voice file format type and sampling rate.

Input Collection 703: Input collection is a set of rules that guides the user of the expanded capability telephone 101 in entering information in a specific format. Input collection allows the creation of input collection format and other associated properties. For example, an input field into which a user is requested to supply a social security number might be formatted as: "SSN: *--****".

Screens 707: A screen is a collection of information, such as softkeys, input collection, and information lines that can be presented to the users throughout an application session. Other properties, such as title status and certain CPE states when a particular screen is displayed, can also be specified.

Scripts 709: Scripts are the logic control programs that control the flow of an application. Scripts can be considered as the "brain" and "object holder" of an application. Scripts specify the logical ordering and presentation sequence of information during an application session. A script makes use of information from other objects, such as screens, softkeys, and input collection, to interact with the users and to control the flow of applications. The scripting language can be any language that permits a developer to designate functions to be performed, and to control the flow of execution of script logic.

An example of a script that alternatively sends screen A or screen B to the expanded capability telephone 101 based on a user's input is:

```
If Input EQ "1"
    SendScreen A
Endif
If Input EQ "2"
    SendScreen B
Endif
```

Script Profile 711: The script profile identifies one or more scripts that make up a given application, and specifies the conditions under which a particular script should be interpreted by the script interpreter 207.

An exemplary embodiment of the ADSI-based application development system further includes two additional objects: an Integration object 713, and a Test Run object 715. These objects differ from the other objects (identified above) in that they do not correspond to aspects of the application being created. Rather, the Integration and Test Run objects 713, 715 control various aspects of the application development process. In particular, the integration object 713 invokes conversion of the other objects into a set of screen files that may be executed by the script interpreter 207.

Figure 8:
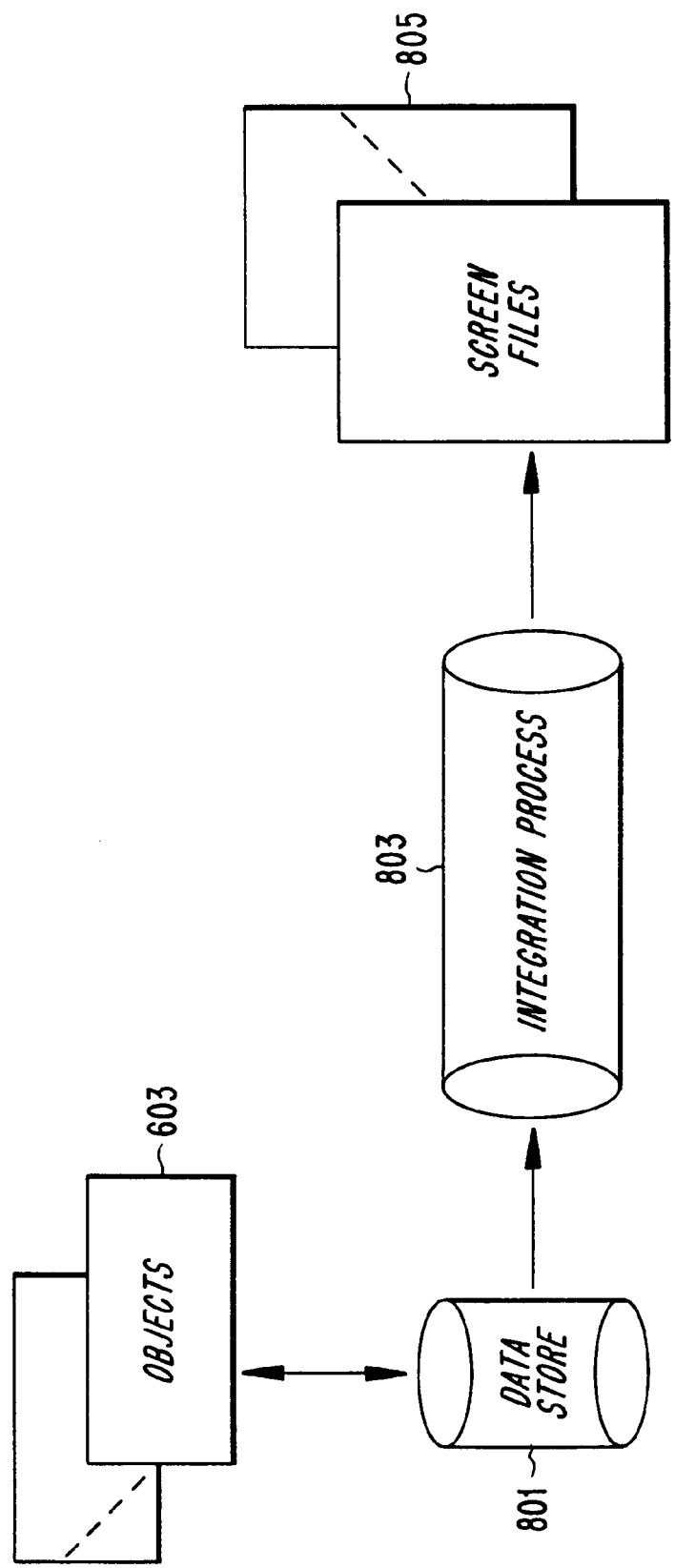
FIG. 8 is a chart depicting the integration process, in accordance with an aspect of the invention.

The integration process is depicted in FIG. 8. A number of objects 603 are created for an application. Those objects 603 that have not been completely specified by the application developer have default values supplied by the development tool 209 itself. The objects 603 are stored on a nonvolatile storage means, referred to herein as a data store 801. This data store 801 can be implemented using a local or remote database, a set of files, or a combination of both. For example, scripts and voice data may be stored in files, while screens and softkey data may be stored in a local database. Such a data store scheme is designed to allow maximum development time performance, flexibility, and manageability. However, the graphical interface 601 and the object properties and behavior do not dictate the implementation of the object data store 801.

Figure 9:
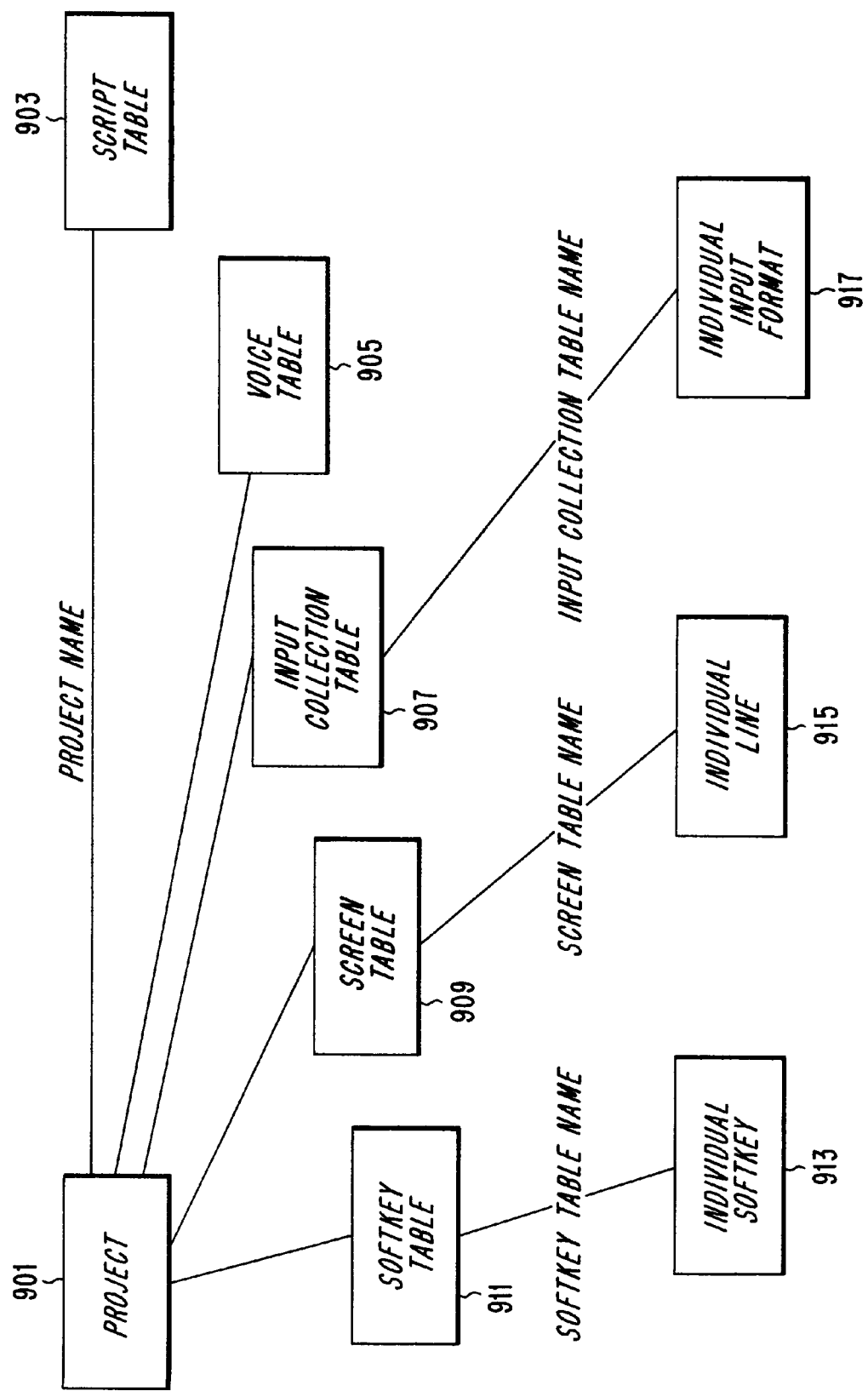
FIG. 9 illustrates an exemplary data store data organization, in one embodiment of the invention.

An exemplary data store data organization is shown in FIG. 9. The data store 801 contains various types of data that are stored in one of two formats: files and databases. The file format is used to store script files and voice files. The database format, such as a relational database, is used to store the rest of the information. Each record in the project table 901 contains information for a particular project, including a project name and unique key. In a preferred embodiment, each application to be developed is organized as a so-called "application project", which is a collection of object instances that together describe the resources used by an application during development. As a default, each project may be organized under a subdirectory of a predefined main directory. Further subdirectories can be created under the project subdirectory, so that screen-related, script-related and voice-related data can each be stored in its own directory.

The softkey table 911, screen table 909, input collection table 907, voice table 905 and script table 903 are related to the project table through the project's unique key. The voice table 905 contains only voice information (e.g., storage location, voice file format type and sampling rates) for each voice file, but does not contain the voice data itself. Similarly, the script table 903 contains only script information for each script file (e.g., script file properties such as file location and file size), but does not contain the script itself.

Each softkey table 911 contains softkey-related information for a particular project including a unique softkey table key, which in the exemplary embodiment is in the form of a softkey label name. The individual softkey table contains information (e.g., actions, long label, short label) regarding each softkey as shown in the softkey object's corresponding graphical interface 601. The individual softkey record 913 is related to the softkey table through the softkey table unique key.

The screen table 909 and input collection table 807 are similarly organized, and are each related to respective individual line records 915 and individual input format records 917 by means of corresponding screen table unique keys (which are screen table names in the exemplary embodiment) and input collection table unique keys (which are input collection table unique names in the exemplary embodiment).

Referring back now to FIG. 8, the integration process 803 performs all necessary operations to convert the format of the data as it appears in the data store 801 into appropriate screen files 805 which may be supplied to, and executed by, the script interpreter 207. The exact steps necessary for performing this conversion will depend on the various formats involved in a particular implementation. Those having ordinary skill in the art will recognize, however, that the integration process is straightforward once the formats of the data store 801 and of the screen files have been defined.

An exemplary screen file format is presented in the following table:

| Data Item | Data associated with the data item |
| --- | --- |
| GlobalPrompt | "PrimaryColumn" "SecondaryColumn" |
| Softkey | "FullLabel" "ShortLabel" "Return String in hex" Normal/Highlight SDC/FD |
| DefaultSk | Softkey1 Softkey2 . . . (Null indicates a null softkey) |
| InitSk | Softkey1 Softkey2 . . . (Null indicates a null softkey) |
| InfoLine | "PrimaryColumn" "SecondaryColumn" "Attribute" Wrap/Nonwrap Centered/LeftJustified/RightJustified/ Indented Softkeys/Default |
| CpeMode | EnableSectionPrompt/DisableSectionPrompt EnableSoftkey/DisableSoftkey |
| UserInputLine | LineNo "PrimaryColumn" "SecondaryColumn" LeftToRight/RightToLeft Wrap/Nonwrap AlphaNumeric/Numeric Centered/LeftJustified/RightJustified/ Indented Buffered(YES/NO) ClearBuffer(YES/NO) Encoded(YES/NO) PRIVACY/NON_PRIVACY TotalTimeout(in secs) InterdigitTimeout(in secs) None(or prefix) VoiceFile/Null |

In accordance with this exemplary embodiment, then, a screen file comprises lines of key words selected from the Data Item column, each followed by a line of Data associated with the data item. The following is an exemplary screen file:

```
//This is a comment line
GlobalPrompt
"Global ADSI" "Solutions, Inc."
Softkey:Done
"Done" "Done" "96048723" Normal SDC // (SDC=Server
Display Control)
Softkey: BkSpace
"Back Space" "BkSpace" "89960B: Normal SDC
Softkey: Cancel
"Cancel" "Cancel" 96044123" Normal SDC
DefaultSk
Done BkSpace Cancel
CpeMode
EnableSectionPrompt
InfoLine:
"Line No.1: " "" "" "Wrap LeftJustified Default
InfoLine:
"Line No.2: " "" "" "Wrap LeftJustified Default
InfoLine:
"Line No.3: " "" "" "Wrap LeftJustified Default
InfoLine:
"Line No.4: " "" "" "Wrap LeftJustified Default
InfoLine:
"Line No.5: " "" "" "Wrap LeftJustified Default
InfoLine:
"Line No.6: " "" "" "Wrap LeftJustified Default
InfoLine:
"Line No.7: " "" "" "Wrap LeftJustified Default
UserInputLine
1 " ***;" "AY*********:LeftToRight Wrap Numeric
LeftJustified Yes Yes No No 30 5 0 None #" vox\input1.vox
UserInputLine
2 " " "***-**-****"LeftToRight Wrap Numeric LeftJustified
```

-continued

```
Yes Yes No No 30 5 0 None #" vox\input2.vox
UserInputLine
3 " " "*" LeftToRight WrapNumeric LeftJustified Yes Yes
No No 30 5 0 None #" vox\input3.vox
```

Figure 10:
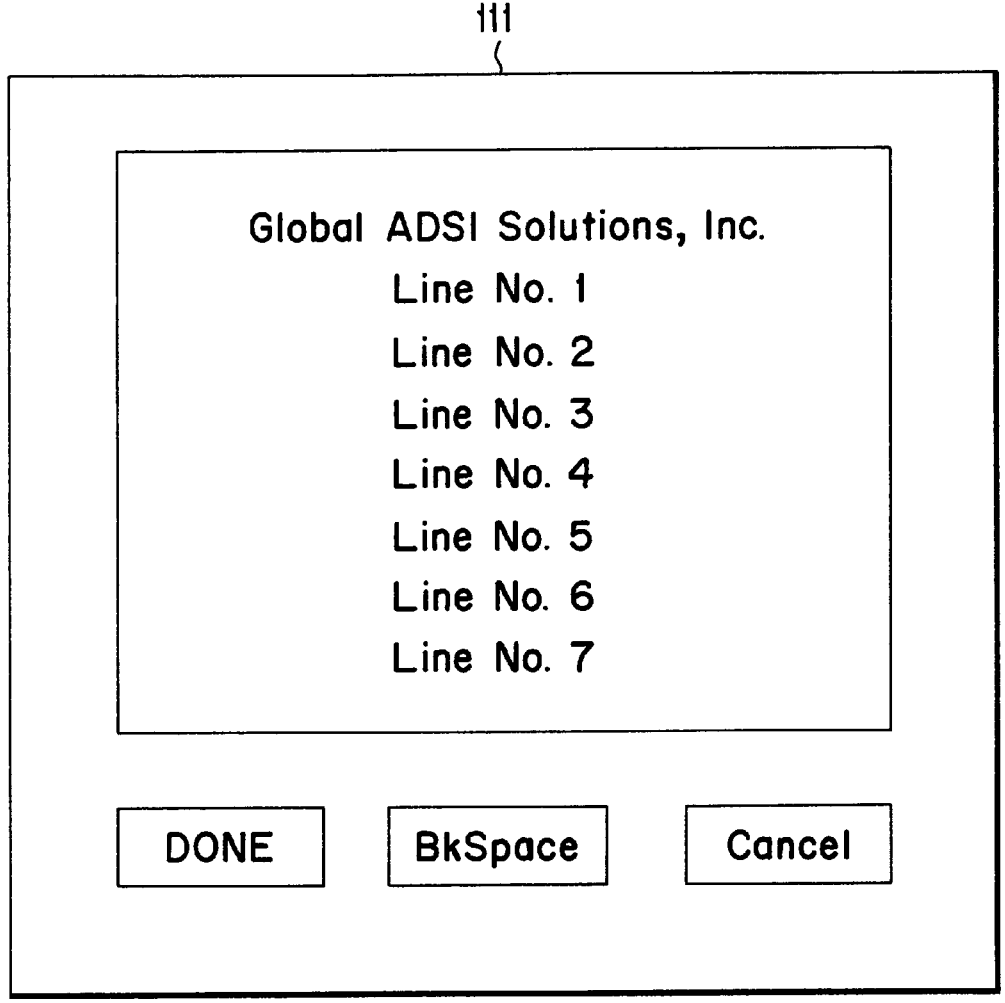
FIG. 10 depicts an exemplary screen image generated by downloading an exemplary screen file to an expanded capability telephone.

During execution in the runtime environment, the above exemplary screen file would be converted into an appropriate ADSI data packet that would cause the screen 111 to display the information as depicted in FIG. 10. When the Softkey labeled "DONE" is pressed, the return string code "96048723" will be executed by the CPE. When the Softkey "BkSpace" is pressed, the return string code "89960B" will be executed by the CPE. When the Softkey "Cancel" is pressed, the return string code "96044123" will be executed.

In another aspect of the invention, after the integration process has been completed, the application developer can further utilize the graphical interface 601 to invoke a test run of the screen files 805 that have been created. In one embodiment, the test run does not utilize a regular version of the runtime engine 203, but instead uses a version that is especially adapted for the application development process. In particular, the development version of the runtime engine 203 should be configured to interact with and run under the development environment, including the inclusion of debugging capability which allows developers to step through the execution of scripts and to monitor script variables. This debugging capability may be removed from the regular version of the runtime engine 203 in order to enhance performance. The runtime engine 203 may be further streamlined (compared to the development version) by reducing screen and file I/O operations that (e.g., display of debugging information) that are unnecessary during normal runtime operation.

The description will now focus on an exemplary set of graphical interfaces 601 for an ADSI-based development tool 209. It will be recognized that, in addition to teaching how an application developer would use the development tool 209, these graphical interfaces 601 show the types of data and behaviors associated with the corresponding set of objects 603 that are in the development tool 209.

Figure 11:
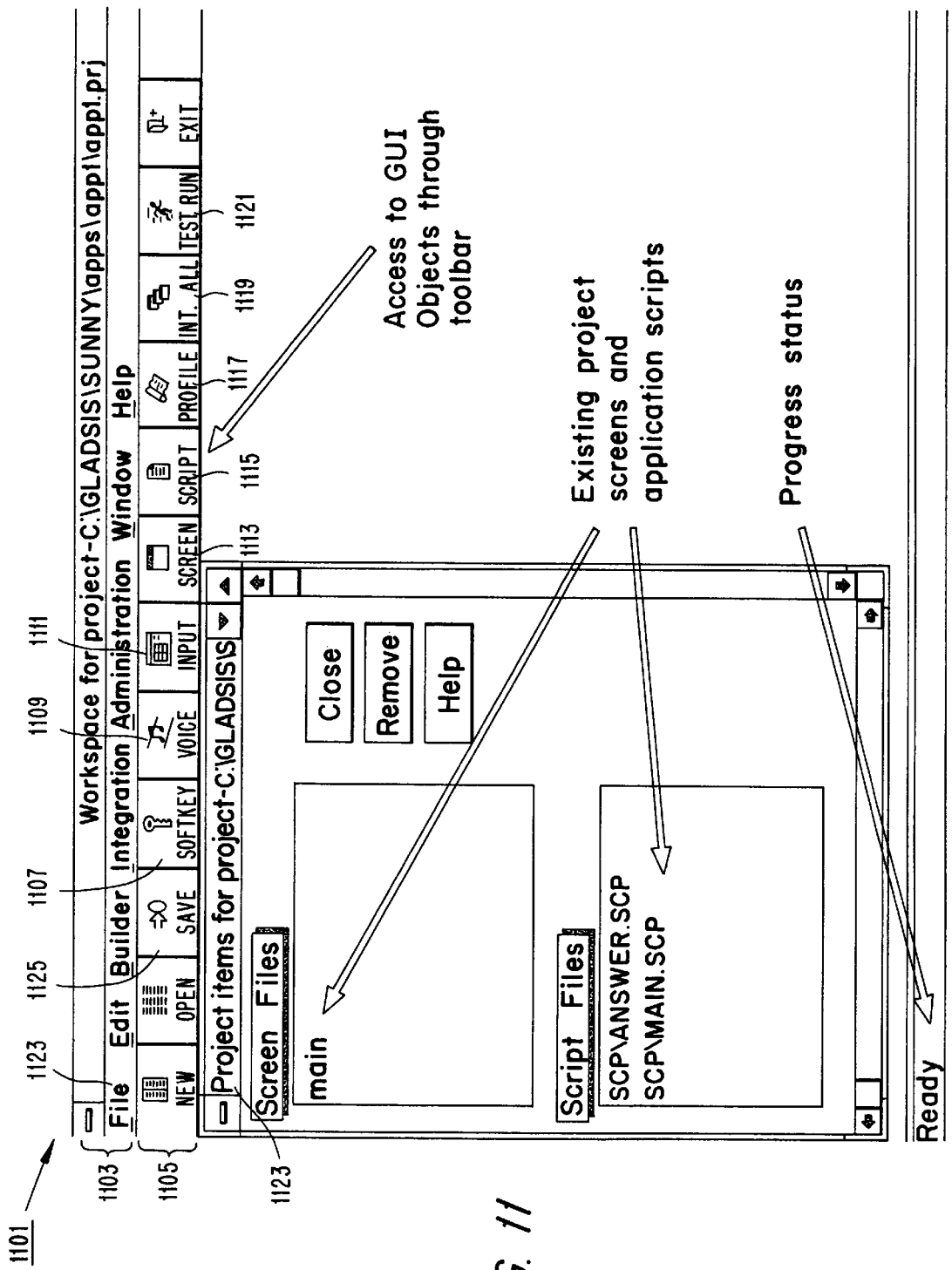
FIGS. 11 through 30 depict an exemplary set of graphical interfaces for an ADSI-based development tool in accordance with an exemplary embodiment of the invention.

FIG. 11 depicts a project workspace 1101. The project workspace 1101 is the default working area that provides the developer access to all of the objects 603 and project components. The project workspace 1101 includes an area of pull-down windows 1103, which provide control of the development tool 209. For added convenience to the developer, the project workspace 1101 preferably also includes a toolbar 1105 which includes icons of the objects that the developer is most likely to want to use. The toolbar 1105 includes a softkey button 1107, a voice button 1109, an input button 1111, a screen button 1113, a script button 1115, and a profile button 1117. Selection of any of these buttons causes an appropriate graphical user interface (GUI) to appear that provides a mechanism for the developer to specify parameters for the corresponding object 603.

The toolbar 1105 also includes an integration button 1119 and a TestRun button 1121 to initiate each of these activities.

Several GUIs/objects will now be described in greater detail.

SOFTKEYS

Softkeys are action keys that a Screen Display Control (SDC) application user presses to perform an action predefined by the SDC application. The Softkey Edit window allows you to create, edit, and delete softkeys used by the application. A developer should refer to Bellcore TA-NWT- 001273, "Generic Requirements for an SPCS to Customer Premises Equipment Data Interface for Analog Display Services" and SR-INS-002461, "Customer Premises Equipment Compatibility Considerations for the Analog Display Services Interface" for further explanations on the use of softkeys. Each of the TA-NWT-001273 and SR-INS-002461 documents has been incorporated herein by reference.

ACCESSING THE SOFTKEY EDIT WINDOW

Figure 12:
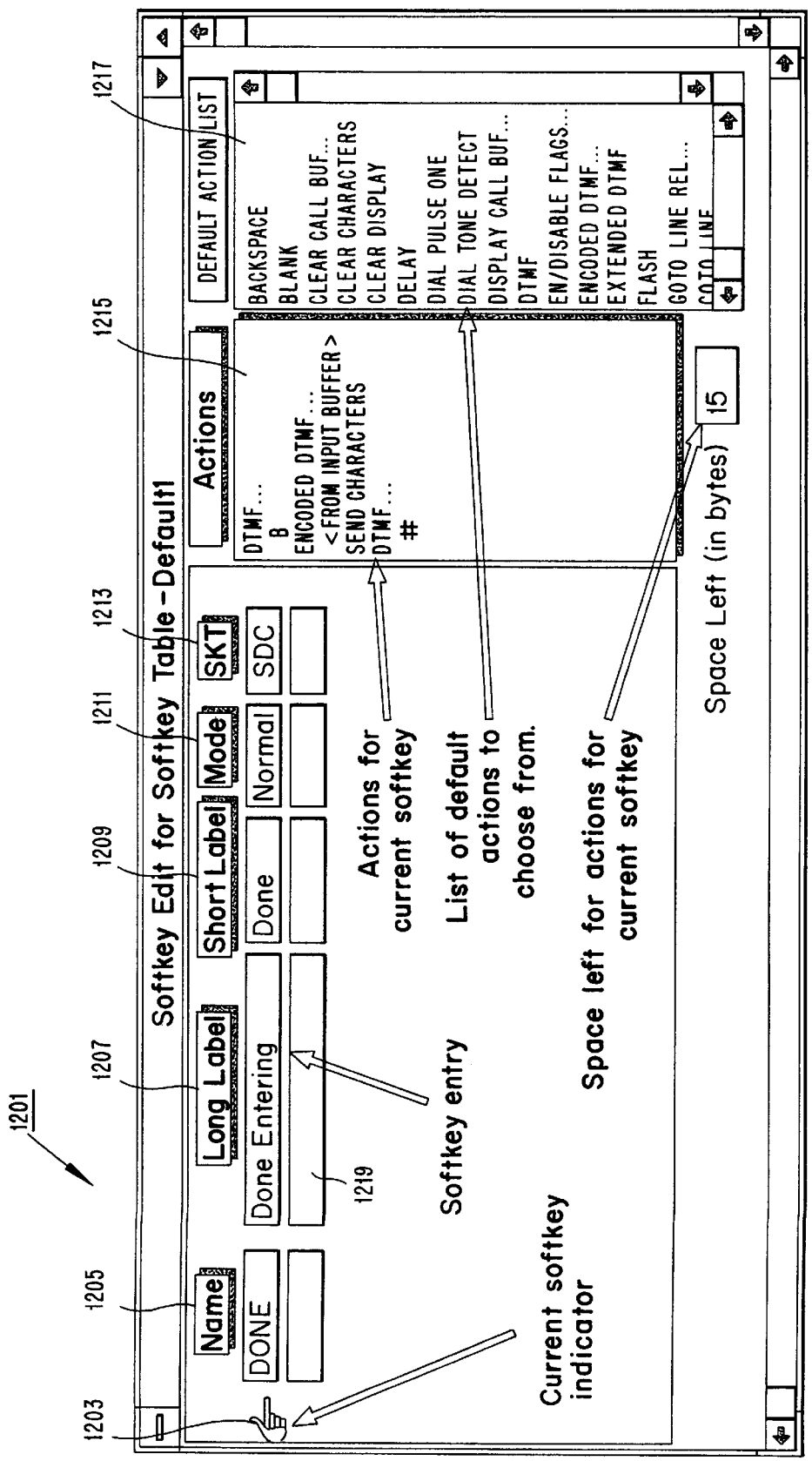

A Softkey Edit window 1201 is shown in FIG. 12. To access the Softkey Edit window 1201, click on the Softkey button 1107 on the toolbar 1105 or select Softkey from the builder menu that can be pulled-down from the pull-down windows 1103.

USING THE SOFTKEY EDIT WINDOW

From the Softkey Edit window 1201 a developer can create, modify, or delete softkeys for the desired application. The Softkey Edit window 1201 displays one or more entries of softkeys that have been defined. The current softkey entry is indicated by the hand icon 1203 on the left of the window. The hand icon 1203 indicates which of the softkeys is currently being worked on. For each softkey, the name 1205, long label 1207, short label 1209, highlighting mode 1211, and the softkey table type 1213 are displayed.

When a softkey entry is made current, its actions are listed in the action box 1215 along with the space left for additional actions at the bottom of the box.

The Default Softkey Action list 1217 is a list of softkey actions, in alphabetical order, that a developer can choose from and modify for the current softkey.

Selecting a Softkey

To select a softkey so that its actions can be viewed, the developer clicks anywhere on the softkey row. Its actions and the amount of space left are displayed. The hand icon 1203 indicates which softkey is currently active.

Adding/Editing a Softkey

To add a new softkey, the developer double clicks anywhere on an empty row 1219 of the softkey entry and an empty Edit Softkey dialog box appears. (An empty row is a row with none of the fields defined.)

Figure 13:
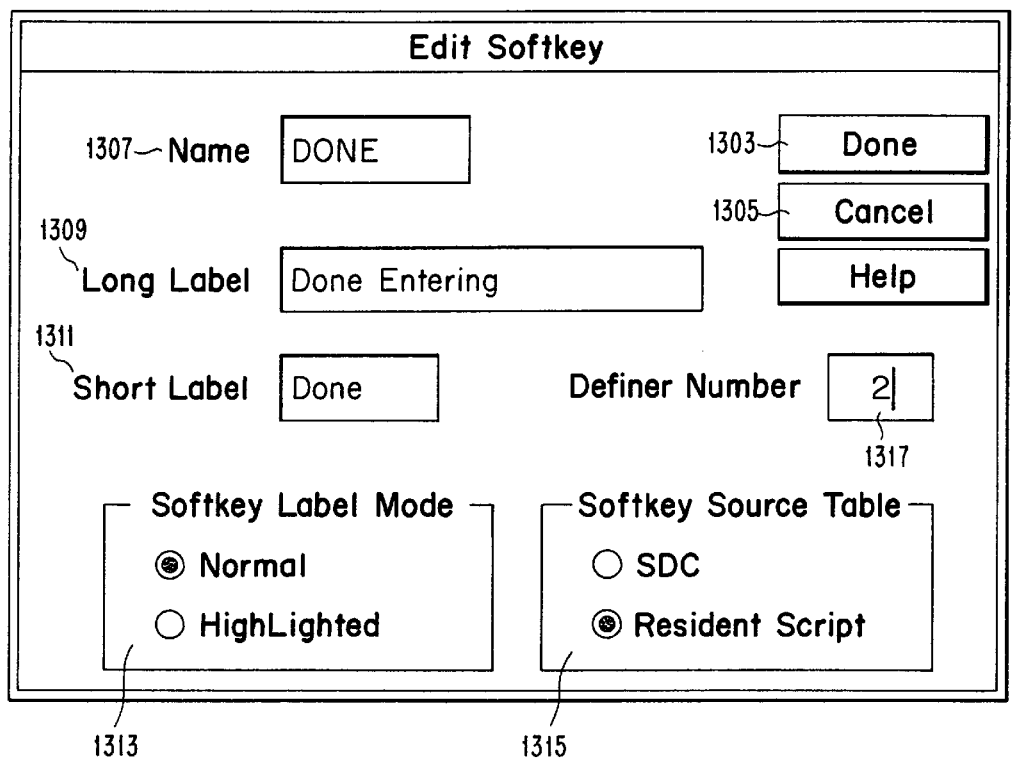

Referring now to FIG. 13, to edit an existing softkey, the developer double clicks anywhere on the softkey row and an Edit Softkey dialog box 1301 appears along with the existing contents of the softkey.

Editing a New/Existing Softkey

The Edit Softkey dialog box 1301 allows the developer to edit a new softkey or modify an existing softkey. Clicking Done 1303 when finished causes the changes to be reflected on the softkey row of the Softkey Edit window 1201. Clicking Cancel 1305 causes the Edit Softkey dialog box 1301 to be closed without making any changes.

Other features of the Edit Softkey dialog box 1301 are:

Name 1307

This is an eight-character internal name used by the development tool 209 to identify a softkey. This is a required field for each softkey. This name identifies a softkey in other GUI objects. Click and type to modify the name.

Long Label 1309 and Short Label 1311

These are the eighteen character long and seven character short labels defined by ADSI. Click and type to modify these labels.

Softkey Label Mode 1313

This field controls the softkey label highlighting modes defined by ADSI. Click on the radio button to select the desired mode.

Softkey Source Table 1315

This indicates in which softkey table the softkeys will be stored when they are sent to the CPE. Reference should be made to Bellcore TR-NWT-001273 for further details. Click on the radio button to select the table type.

If the resident script softkey source table is selected, a definer number field 1317 will appear on the Edit Softkey dialog box 1301 in which you can specify the softkey definer for the softkey. The definer number field 1317 does not appear in the Edit Softkey dialog box 1301 if SDC is selected in the Softkey Source Table 1315. The developer should make sure that the specified definer number matches that of the script softkey to be downloaded to the extended capability telephone 101.

Inserting/Deleting a Softkey

Figure 14:
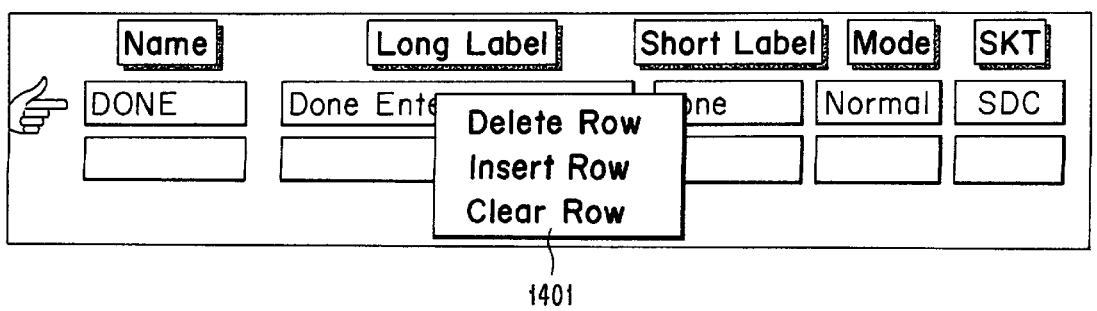

To insert a softkey, the developer moves the pointing device (e.g., a computer "mouse") on the Softkey Edit window 1201 to the softkey row that is just before the row in which a new softkey is desired, and then clicks on the right mouse button to bring up the pop-up menu 1401 (see FIG. 14). Selecting Insert Row causes a new softkey row to be inserted and the empty Edit Softkey dialog box to be displayed.

It should be noted that, in general, there is no significance to the order of the softkeys in the softkey Edit window 1201. It is just a matter of preference and the organization of information. The order of the softkeys does not change how a softkey is used or behaves.

To delete a softkey, the mouse pointer should be moved to the softkey row that is to be deleted. Clicking on the right mouse button will bring up the pop-up menu 1401. Selecting "Delete Row" will cause a Delete Row dialog box to appear with the name of the softkey to be deleted. Clicking "Yes" will confirm and consequently cause the deletion. The delete operation can be cancelled by clicking "No".

Softkey Actions

Softkey actions define the behavior of a softkey. Reference should be made to Bellcore SR-INS-002461 for further details. The developer is required to specify at least one softkey action for each softkey.

Each softkey action usually occupies one line in the current softkey action list box 1215 (FIG. 12). Those actions requiring more than one line are indicated by three trailing dots ( . . . ) at the end of the action name. These dots also indicate that the developer needs to supply additional information to complete the specification of the action when the action is first added to the active softkey action list box 1215. The information that is supplied to complete the specification of the action will be shown on the line immediately underneath the name of the action in the current softkey action list box 1215.

A list of default softkey actions as defined in Bellcore TR-NWT-001273 are shown in the Default Action List 1217 portion of the Softkey Edit window 1201. Actions may be chosen from this list and added to the current softkey actions list 1215. Certain actions will require modification when they are added to the list.

Adding/Inserting a Softkey Action

To add or insert a softkey action to the current softkey action list 1215, the action should be selected from the Default Actions list 1215. The left mouse button should then be clicked and released. This will cause a drag icon to appear to indicate that the drag and drop mode is active and that the action just selected is ready to be dropped into the destination list.

To add this action to the end of the existing actions, move the drag icon to the empty region at the bottom of the current softkey action list 1215 and then click the left mouse button to drop the item. The action will then be added to the end of the existing list. If this particular action requires further details to be specified, an action-specific dialog box will be displayed. See subsequent sections for further details on these dialog boxes.

To insert this action in between two existing actions, drop the drag icon between the two actions. The developer should make sure that the center of the insertion point of the drag icon is in between the two actions before clicking the left mouse button to drop the item.

Editing a Softkey Action

To edit a softkey action in the current softkey action list box 1215, double click on the action name. Only actions with trailing dots ( . . . ) can be edited. For these actions, the developer can double click on either line. As a result of double clicking, an action-specific dialog box will be displayed.

Deleting a Softkey Action

To delete a softkey action from the current softkey action list box 1215, the developer moves the mouse pointer to the action name and then clicks the right mouse button to display a pop-up menu that offers selections such as "Delete This", "Delete All", "Modify" and "Hide This". For actions that occupy two lines, either line can be selected. To complete the deletion, the developer should select the "Delete This" item. This causes a Delete Item dialog box to be displayed along with the name of the action to be deleted. Clicking "Yes" will confirm the deletion. Clicking "No" will cancel the deletion.

Specifying Details for Softkey Actions

As mentioned above, a number of softkey actions require additional information whenever they are added to the current softkey action list box 1215. These actions are identified by the three trailing dots ( . . . ) in the default action list. Reference should be made to Bellcore SR-INS-002461 for definitions and specifications for each action or for softkey return string codes.

The softkey actions that require additional information are discussed in the following subsections. To access the dialog boxes described below, double click on the action names in the current action list box 1215 or drop a new action into the current action list box 1215. For a new softkey action, the default values, if any, will be displayed.

In the following subsection headings, the name of the action as it appears in the default action list is shown in parenthesis.

Clear Call Buffer (Clear Call Buf . . . )

The dialog box for this action allows the user to select one of two buffers. The developer should click on the radio button for the call buffer number that it is desired to clear.

Delay (Delay . . . )

The dialog box for this action permits specification of a delay length. Enter the length of delay between 1 to 254 in ten milliseconds increments. The dialog box will display the entered value in milliseconds and also in seconds.

Display Call Buffer (Display Call Buf . . . )

Figure 15:
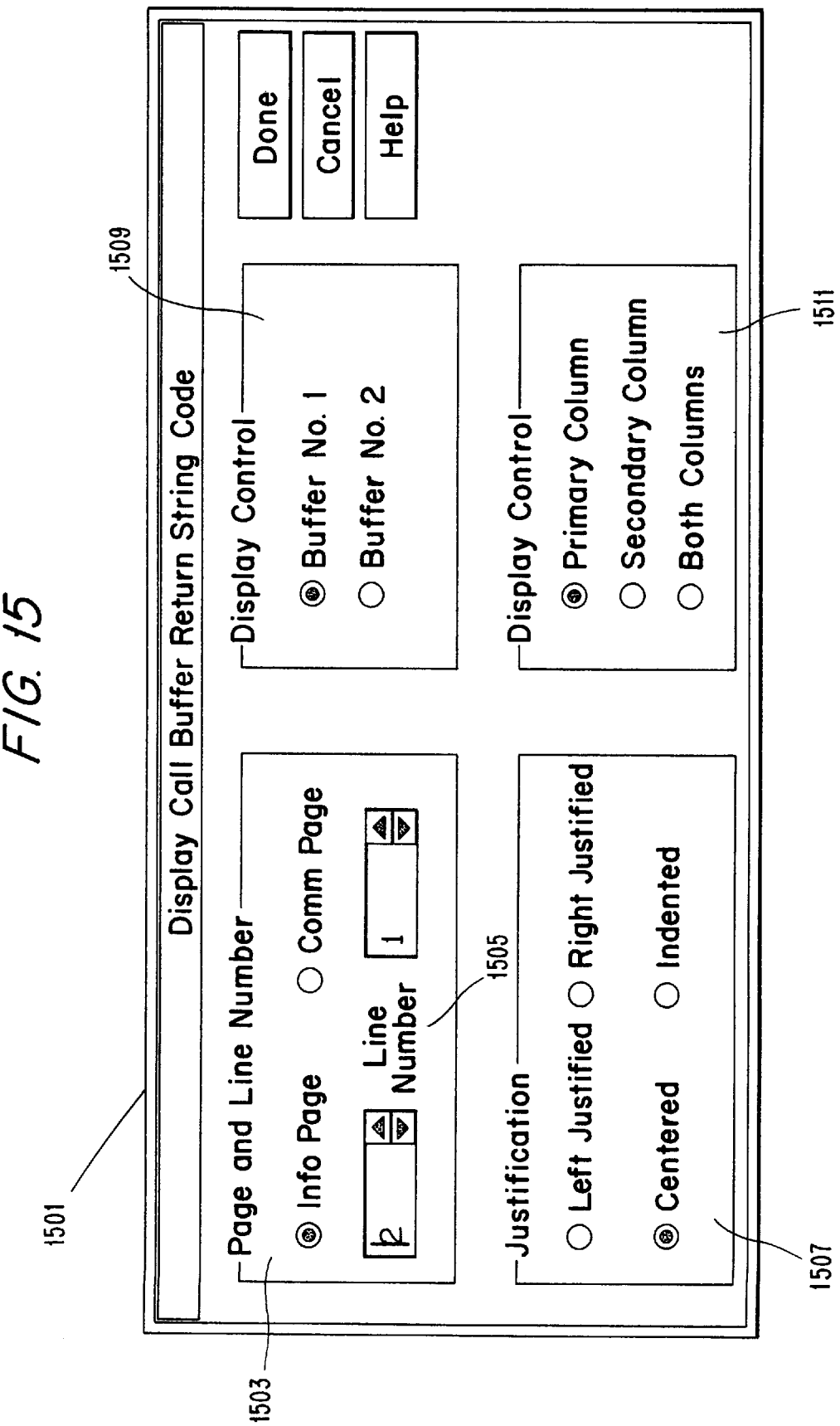

The Display Call Buffer dialog box 1501 for this action is shown in FIG. 15. To choose the page type 1503, click on the radio button for either the Information page (Info Page) or the Communication page (Comm Page). Specify the line number 1505 by clicking on the up or down arrow of the spin control. In this exemplary embodiment, the developer is not allowed to type the line number directly. A line number can be specified for either page, but only the line number for the selected page is used.

To specify the justification 1507 (i.e., left, right, centered or indented), the developer clicks on the appropriate radio button.

To specify the display control, the developer clicks on the radio button for the buffer number 1509 and column type 1511.

DTMF (DTMF . . . )

The dialogue box for this action permits the developer to specify regular (straight) DTMF to be sent, by clicking and typing the desired DTMFs. The valid DTMFs are A,B,D,*,#, and 0–9. The length of the DTMF that can be entered depends on the space left in the current action list. When the developer presses "Done", a prompt is displayed if there is not enough room for the DTMF that have been specified.

Enable/Disable Flags (En/Disable Flags . . . )

The dialog box for this action allows the developer to alternatively enable or disable values of the INSK, INKP, INAL and INCC flags. To do this, the developer clicks on the Enable or Disable radio buttons of the corresponding flags.

Encoded DTMF (Encoded DTMF . . . )

For sending static alpha numeric characters using DTMF encoding, the dialog box for this action allows the developer to select a "User Defined Constant" radio button from a Data Source group and then click and type the characters in the character input box. It is recommended that only displayable characters be specified. Otherwise, the CPE's response to any non-displayable characters may not be predictable.

To send characters from the input buffer using DTMF encoding, the developer would select a "From Input Buffer" radio button from the Data Source group. This causes the character input box (within the dialog box) to be hidden.

The developer should make sure that if it is chosen to send characters from the input buffer, the Send Characters action should be added immediately after this action in the current action list box 1215.

Go To Line Relative (Goto Line Rel . . . )

The dialog box for this action permits the developer to specify the direction of the cursor line on the CPE screen that will be moved when this code is executed. Specification is made by alternatively clicking on an Up or Down radio button. Clicking on the up or down arrow of a spin control in the dialog box will change the number of lines.

Go to Line (Goto Line . . . )

The dialog box for this action permits a developer to specify the type of page to go to by clicking on either an Information page (Info Page) or Communication page (Comm Page) radio button. Clicking on the up or down arrow of a spin control of the corresponding page will specify the line number. The line number for either page can be specified, but only the line number of the selected page is used in the action.

Tab Field (Tab Field . . . )

The dialog box for this action allows the developer to click on either a Primary Column or a Secondary Column radio button in order to specify the column to tab to.

User Defined (User Defined . . . )

The dialog box for this action includes a field into which the developer may type the return string codes in hexadecimal values. Two characters should be used for each hexadecimal value. For example, for the hexadecimal value 0x8C 0x04, the developer would type 8C04.

It is preferable that this feature be used only by experienced users, and that it not be used to specify any existing return string codes.

Printing Softkey Information

Figures 16, 17:
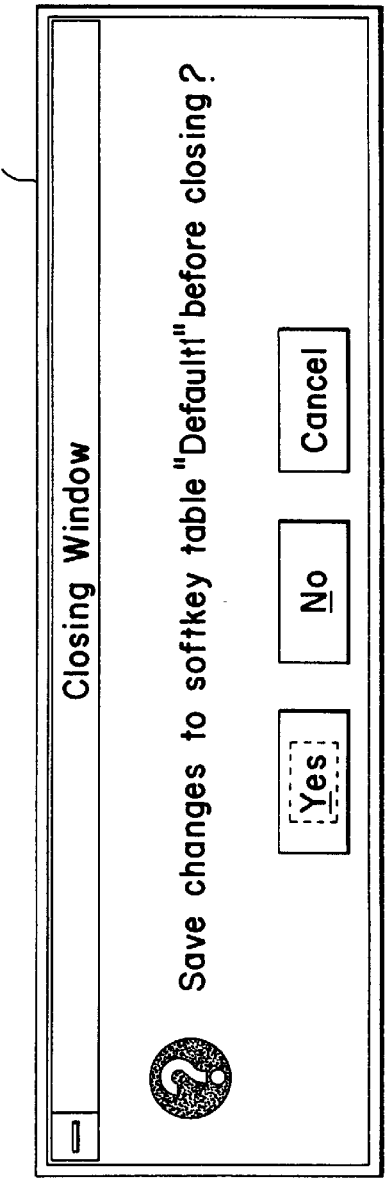

The developer can make a print out of all the softkey information including softkey name, long and short labels, mode, softkey table type, definer, and actions. To print, select Print from the File menu 1123 (see FIG. 11) while the Softkey Edit window 1201 is active. FIG. 16 shows an example of a print out of softkey information.

Saving Changes to Softkeys

The developer can save any changes that were made to the softkeys in the Softkey Edit window 1201 by clicking on the Save button 1125 on the toolbar 1105 or by selecting Save from the File menu 1123. The developer should make sure that the Softkey Edit window 1201 is the active window when changes are saved.

Exiting the Softkey Edit Window

To exit the Softkey Edit window 1201, the developer double clicks on the control menu of the window or alternatively selects "Close" from the File menu 1123. If any changes have been made to a softkey, a Closing Window dialog box 1701 displays. The Closing Window dialog box 1701 gives the developer the opportunity to save changes to the softkey table by clicking "Yes". Clicking "No" will exit without saving changes. Clicking "Cancel" will return the developer to the Softkey Edit window 1201 without saving changes or exiting.

INPUT COLLECTION

Figure 18:
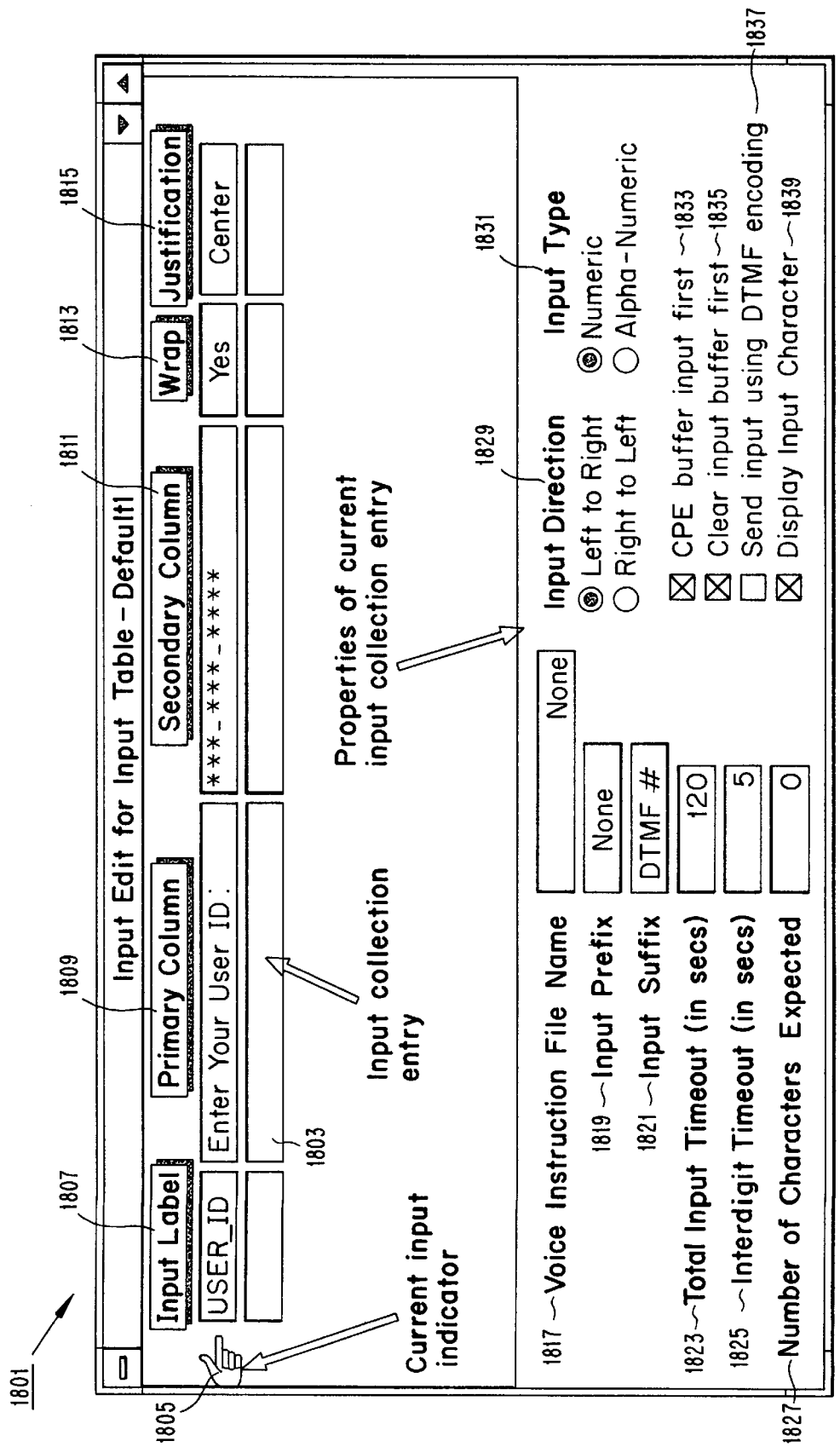

Input collection guides users of ADSI-compatible telephones in entering information in a specific format. Referring now to FIG. 18, an Input Edit window 1801 allows the developer to create, edit, and delete input collection entries that will be used by the application. Input collection entries specified in this window are referenced by information lines in the screen Edit windows. Reference should be made to Bellcore TR-NWT-001273 for further details on input collection.

Accessing the Input Edit Window

To access the Input Edit window 1801, the developer clicks on the Input button 1111 on the toolbar 1105 or alternatively selects Input Collection from the Builder menu that can be pulled-down from the pull-down windows 1103.

Using the Input Edit Window

The Input Edit window 1801 allows the developer to create, modify, or delete input collection formats and controls for the application under development. The Input Edit window 1801 displays one or more entries of input collections 1803 that have been defined. The current input entry is indicated by the hand icon 1805 on the left of the window.

The hand icon 1805 indicates which one of the input collection entries 1803 is currently being worked on. For each input collection entry 1803, the name 1807, primary column 1809, secondary column 1811, wrap indicator 1813, and justification 1815 are displayed.

When an input collection entry 1803 is made current, its properties are listed in the bottom half of the Input Edit window 1801.

Selecting an Input Collection Entry

To select an input collection entry 1803 so that its properties can be viewed and modified, the developer may click anywhere on the input collection entry 1803. The hand icon 1805 indicates which input collection entry is currently active.

Adding/Editing an Input Collection Entry

There should always be an empty input collection entry at the bottom of the existing input collection entries 1803. If this empty row has just been used for a new entry, an additional new entry may be added by clicking on the justification field 1815 of the last row of the existing entries and then pressing the Tab key. An empty entry that can be used for the new entry will then be displayed. In general, as long as an insertion point is in any of the existing fields, the developer can repeatedly press the Tab key until a new row appears.

To edit an existing input collection entry, the developer clicks and types on any of the fields of the entry to be edited. The Tab key may be used to move to the next field. Pressing the Tab key while at the last field of the entry brings the cursor to the first field of the next entry. Pressing the Tab key while at the last field of the last entry displays a new empty entry.

Editing an Input Collection Entry

To edit an input collection entry 1803, the entry should be selected so that its properties will be displayed.

Input Label 1807

The input label 1807 is an eight-character internal name used by the development tool 209 to identify an input collection entry 1803. This is a required field for each input collection entry 1803. This name is used for identifying an input in other GUI objects. The developer should click and type in order to modify the name.

Primary and Secondary Columns 1809, 1811

The primary and secondary columns 1809, 1811 are two 20-column input format fields that are used to guide the user of the expanded capability telephone 101 in entering data. Reference should be made to the input Format parameter of Bellcore's TR-NWT-001273 for further details. Click and type to modify the columns. At least one asterisk (*) character should be placed in either one of the primary and secondary columns 1809, 1811.

Wrap Indicator Field 1813

The wrap indicator field 1813 identifies how the primary and secondary columns 1809, 1811 should be formatted. Clicking on the wrap indicator field 1813 causes a drop-down list box to be displayed. The drop-down list permits the developer to specify either "Yes" or "No" for the wrap indicator field 1813.

Justification Field 1815

The justification field 1815 controls whether the primary and secondary columns 1809, 1811 will be left justified, right justified, centered, or indented. Clicking on the justification field 1815 causes a drop-down list box to be displayed, which permits the developer to designate any of these four choices.

The bottom portion of the input collection window 1801 includes additional fields that indicate and control properties of the current input collection entry 1803. These will now be described in detail.

Voice Instruction File Name 1817

The voice instruction file name 1817 provides a means for the developer to specify a voice prompt to be played each time the current input collection entry 1803 is used for collecting user input. Clicking on the voice instruction file name field 1817 causes a drop-down list box of all the voice files in the project to be displayed. From the list, the developer may select an appropriate voice file for the current input entry 1803. Alternatively, the developer can type the name of the voice file. In this case, file path information should be included.

The developer should make sure that any changes to the voice files in the project (such as adding new files) are saved, so that the list will be updated.

Input Prefix Field 1819

If a static prefix DTMF character was specified in the softkey action 1215 for the softkey that the users use to send the input characters for the current input entry 1803, then the same character should also be specified in the input prefix field 1819. For example, if the users are required to press the DONE softkey when they finish entering data for this input collection entry 1803, and the actions for the DONE softkey are:

```
DTMF . . .
    B
Encoded DTMF . . .
    <From Input Buffer>
Send Characters
DTMF . . .
    #
``` then DTMF B should be selected for the input prefix field 1819. This DTMF is used by the runtime engine 203 to identify the beginning of a particular input collection and to decode the actual user input. To designate a selection, the developer should click on the input prefix field 1819 in order to cause a drop-down list box to appear, displaying all the valid choices. The developer should choose an appropriate character or None if no prefix DTMF character was used in the softkey actions.

Input Suffix Field 1821

The input suffix character is similar to the input prefix character. It is used by the runtime engine 203 to detect the end of a variable length input collection. Thus, using the example presented above, DTMF # should be designated in the input suffix field 1821, because this DTMF character should match that which was specified in the softkey actions 1215.

Total Input Timeout Field 1823

The total input timeout value (specified in seconds) determines when the runtime engine 203 should generate a timeout event in response to user inactivity during the input collection. A value may be specified by clicking and typing an appropriate value in the total input timeout field 1823.

Interdigit Timeout Field 1825

The interdigit timeout value (specified in seconds) determines when the runtime engine 203 should generate a timeout event in response to delays between any two DTMFs during input collection. In non-buffered input collections, this value is used to time how fast a user should type. In buffered input collections, this value is used to safeguard missing DTMFs such as the suffix character. The developer may specify a value for this parameter by clicking on the interdigit timeout field 1825 and then typing an appropriate value.

Number of Characters Expected Field 1827

For variable length input, this value should be set to zero and the suffix character should be used to terminate the input collection. For static length input, this value should be set to the number of characters expected, including any prefix or suffix characters. In general, prefix and suffix characters are not necessary for static length input. This parameter may be specified by clicking on the number of characters expected field 1827 and then typing an appropriate value.

Input Direction Field 1829

The setting of the input direction field 1829 specifies the direction in which the input characters should be displayed when they are entered. For further details, reference should be made to the Input Format parameter in Bellcore's TR-NWT-001273 document. The developer may make a selection by clicking on the appropriate radio button in the input direction field 1829.

Input Type Field 1831

The setting of the input type field 1831 permits the developer to indicate the type of input characters allowed during input collection. Selection is made by clicking the appropriate radio button. Valid input character types are numeric only or alphanumeric. If numeric only is specified, then the "Send input using DTMF encoding box" 1837 will automatically be unchecked. If alphanumeric is specified, then the "CPE buffer input first" box 1833 and "Send input using DTMF encoding box" 1837 are checked automatically.

CPE Buffer Input First Box 1833

The CPE buffer input first box 1833 specifies whether the characters entered should be buffered in the CPE input buffer before being sent. If checked, all characters entered by the users are buffered. If not checked, characters entered by the users are sent by the CPE the moment they are entered. If the input type is alphanumeric, all characters entered by the users are buffered and this field is checked automatically. If the developer unchecks this field and the input type is alphanumeric, the setting of the CPE buffer input first box 1833 is ignored and buffering is assumed.

Clear Input Buffer First Box 1835

The clear input buffer first box 1835 specifies whether the CPE input buffer should be cleared before input collection begins for this input collection entry. A check in this box indicates that the input buffer should be cleared.

Send Input Using DTMF Encoding Box 1837

The send input using DTMF encoding box 1837 specifies whether the characters sent from the CPE are straight DTMF characters or DTMF encoded ASCII characters. This field is used by the runtime engine 203 to decode input characters from the CPE. If input type is numeric, the send input using DTMF encoding box 1837 is unchecked automatically, and if input type is alphanumeric, the send input using DTMF encoding box 1837 is checked automatically.

Display Input Character Box 1839

The display input character box 1839 specifies whether the characters entered by the users during input collection for this input collection entry should be displayed as is or obscured. If it is desired to protect the characters entered from appearing on the screen 111 (as would be the case for a password entry), then the display input character box 1839 should be left unchecked.

Inserting/Deleting an Input Collection Entry

To insert an input collection entry 1803, the developer moves the mouse pointer to the input collection entry to a location just before the location at which it is desired to insert an empty entry and clicks on the right (secondary) mouse button to bring up a pop-up menu that permits selection of "Delete Row", "Insert Row" or "Clear Row". The developer should select "Insert Row". This will cause a new input collection entry to be inserted. This new row can be used to specify a new input collection entry 1803. It should be noted that there is no significance to the order of the input collection entries 1803 in the Input Edit window 1801. The order of the input collection entries 1803 does not change how an input collection entry 1803 is used or behaves. The order is just a matter of preference in how information will be organized.

To delete an input collection entry 1803, the developer moves the mouse pointer to the input collection entry 1803 that is to be deleted, and clicks on the right (secondary) mouse button to bring up the pop-up menu that permits selection of "Delete Row", "Insert Row" or "Clear Row". Selecting "Delete Row" causes a Delete Row dialog box to appear with the name of the input collection entry 1803 to be deleted. Clicking "Yes" will confirm the deletion, while clicking on "No" will cancel the delete operation.

Saving Changes to the Input Edit Window

The developer can save any changes that have been made to the input collection entries 1803 in the Input Edit window 1801 by clicking on the Save button 1125 on the toolbar 1105 or by selecting Save from the File menu 1123. The developer should make sure that the Input Edit window 1801 is the active window when saving changes.

Exiting the Input Edit Window

To exit the Input Edit window 1801, the developer double clicks on the control menu of the window or alternatively selects Close from the File menu 1123. If any changes have been made to the input collection entries 1803, a Closing Window dialog box displays, asking whether the changes should be saved before closing. A default name of the Input Edit window 1801 will also be supplied. Clicking "Yes" will save the changes and then exit. Clicking "No" will exit without saving changes. Clicking "Cancel" will return the developer to the Input Edit window 1801 without saving changes or exiting.

SCREEN OBJECT EDITOR

Figure 19:
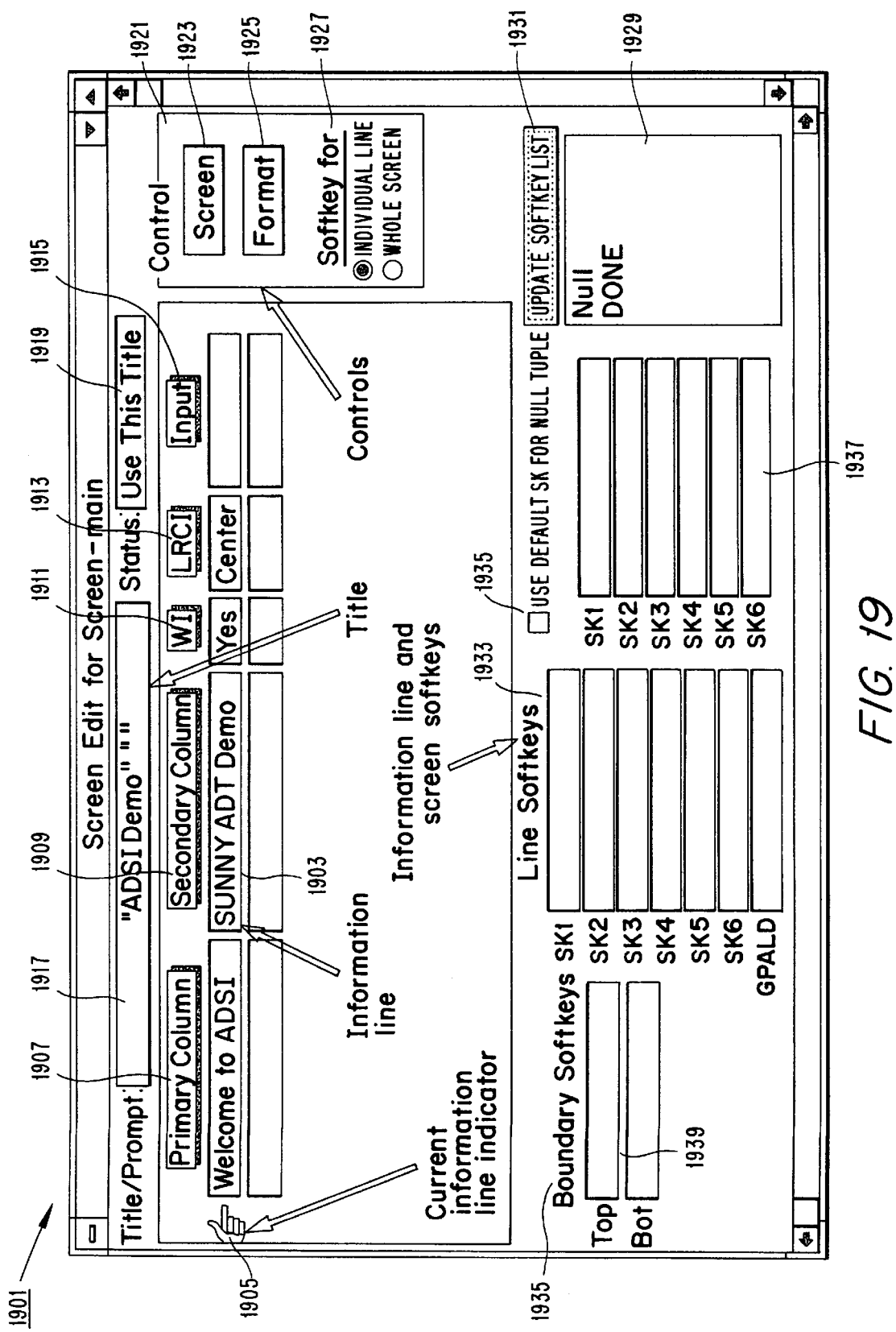
Figure 20:
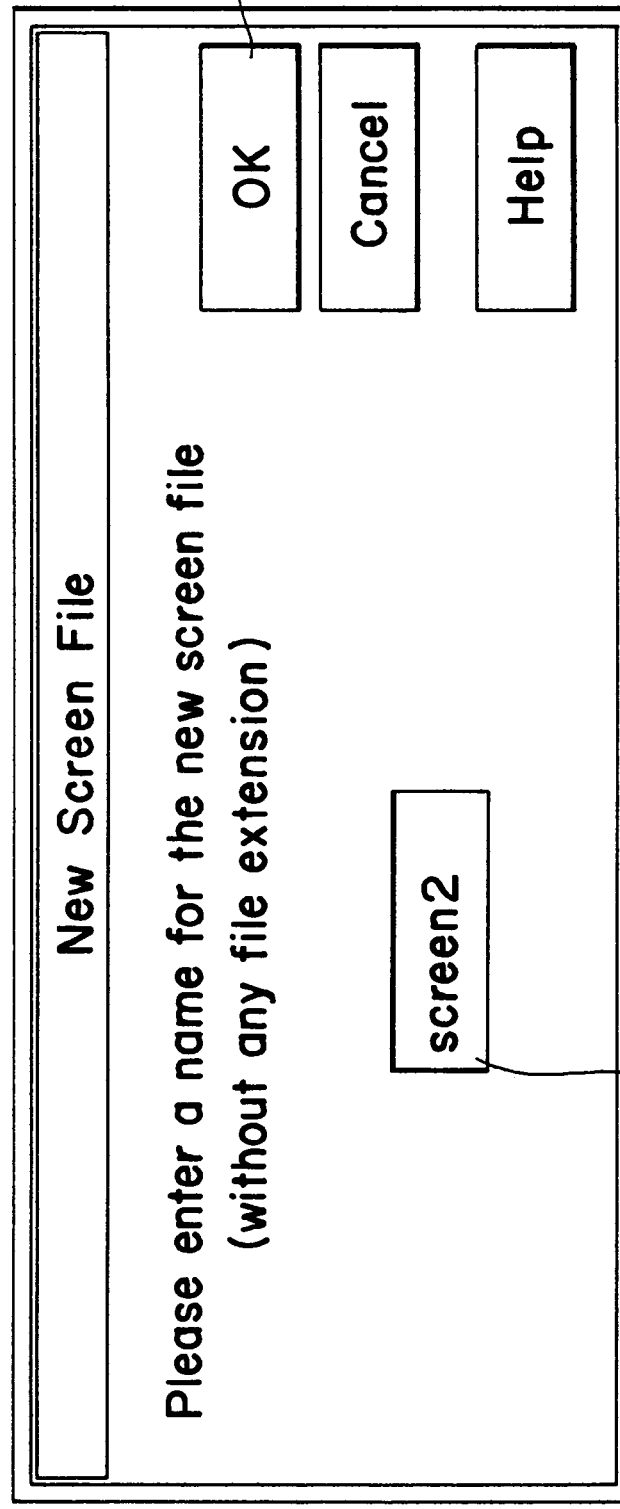

The screen object enables an ADSI developer to focus on the screen user interface of his/her applications, and leaves the details of the ADSI protocol to the script interpreter 207. The GUI for the screen object is a screen editor window 1901 that is selected by the screen button 1113. FIG. 19 shows the screen editor window 1901. Using the screen editor window 1901, the developer only needs to fill in the needed information and let the script interpreter 207 translate data generated by the screen object (screen file) into ADSI protocol data.

In this exemplary embodiment, the screen object is an object container that can include other objects. In the GUI environment, the softkey object and input object can be included in the screen object and perform the required functions. The screen editor window 1901 will now be described in greater detail.

Screens

An ADSI screen is a collection of information, such as softkeys, input collection, and information lines that are presented to the users throughout an application session. The Screen Edit window 1901 allows the developer to specify screen information and incorporate input collection entries and softkeys that have been specified using other windows.

Accessing the Screen Edit Window

To access the Screen Edit window 1901 for editing a new screen, the developer clicks on the Screen button 1113 on the toolbar 1105 or alternatively selects Screen from the Builder menu that can be pulled-down from the pull-down windows 1103. This will cause a new Screen File dialog box 2001 to appear. The developer should type in a unique screen name 2003 of up to eight characters for this new screen. No file extension should be specified. Click OK When finished, clicking OK will cause the Screen Edit window to be displayed.

If it is desired to access the Screen Edit window 1901 for editing an existing screen, the developer should double click on the name of the screen file in the Project Item window 1123. The Screen Edit window 1901 will then be displayed along with the contents of the screen.

Using the Screen Edit Window

The Screen Edit window 1901 provides a means for the developer to specify screen information for the application under development. A screen comprises one or more information lines 1903. All lines in a Screen Edit window 1901 are presented to the users as a logical section when sent to the ADSI CPE. For descriptions of a logical section, reference should be made to Bellcore TR-NWT-001272, which is hereby incorporated by reference herein. One or more softkeys can be specified for each information line or for the whole screen. Input collection entries can be overlaid on the information lines. The state of the CPE can be specified when a screen is presented.

The screen Edit window displays one or more information lines 1903. The current information line is indicated by the hand icon 1905 on the left of the window. The hand icon 1905 indicates which information line 1903 is currently being worked on. For each information line 1903, the primary column 1907, secondary column 1909, wrap indicator 1911, justification indicator (LRCI) 1913, input overlay 1915, and formatting attributes are displayed. If different softkeys are specified for each information line 1903, these softkeys are displayed at the bottom portion of the Screen Edit window 1901.

Selecting Information Line

To select an information line 1903, the developer may click anywhere on the information line 1903. The hand icon 1905 indicates which information line is currently active.

Adding/Editing an Information Line

There should always be an empty information line at the bottom of the existing information lines 1903. If this empty line has just been used for a new information line and an additional new line is desired, the developer should click on the last field of the last information line 1903 and then press the Tab key. An empty information line 1903 will then be displayed that can be used for the new information line 1903. In general, as long as the insertion point is on any of the fields of the existing information lines 1903, the Tab key can be repeatedly pressed until a new information line 1903 appears.

To edit an existing information line 1903, the developer clicks and types on any of the fields of the line to be edited. The TAB key can be used to move to the next field. If the cursor is at the last field of an information line, pressing the Tab key will bring the cursor to the first field of the next entry. If the cursor is at the last field of the last information line 1903, pressing the Tab key appends a new empty information line 1903.

Editing an Information Line

Before editing an information line 1903, the information line 1903 should be made current by clicking on any one of the fields of the information line 1903.

Primary and Secondary Columns

The primary column 1907 and secondary column 1909 are the two 20 column information fields that are used to display information to the user. For further details, reference should be made to the Load Virtual Display parameter of Bellcore's TR-NWT-001273 document. To modify either column, the developer simply clicks and types.

Wrap Indicator (WI) Field 1911

The wrap indicator field 1911 designates how the primary and secondary columns 1907, 1909 will be formatted (i.e., with or without wrapping). Clicking on the wrap indicator field 1911 causes a drop-down list box to be displayed. The developer can use the drop-down list box to designate either Yes or No for the wrap indicator field 1911.

Justification Indicator (LRCI) Field 1913

The justification indicator field 1913 may be used to designate text in the primary and secondary columns 1907, 1909 as being either left justified, right justified, centered, or indented. The developer clicks on the justification indicator field 1913, which causes a drop-down list box to display the four choices. Reference should be made to Bellcore TR-NWT-001273 for further details.

Input Overlay (Input)

To display, on the CPE screen, an input collection entry 1803 that was previously specified using the Input Edit window 1801, the developer overlays the two input columns of the input collection entry field 1915 on the information line 1903.

To overlay an input collection entry 1803 on an information line 1903, the developer clicks on the input collection entry field 1915 to cause a drop-down list box to appear. This drop-down list box displays all the input collection entries 1803 that were previously specified using the Input Edit window 1801. An appropriate input collection entry 1803 should be selected from the list. When sent to the CPE, the primary and secondary columns of the selected input collection entry 1803 will be displayed instead of the columns of the information line.

To remove the overlay input collection entry 1803, the developer should highlight the input collection entry field 1915 and press the delete key.

Inserting/Deleting an Information Line

To insert an information line 1903, the developer moves the mouse pointer to the information line located before the point at which it is desired to insert a new information line 1903, and clicks on the right mouse button to bring up pop-up menu, whose choices include "Delete Row" and Insert Row". The developer selects "Insert Row" and a new information line 1903 is inserted.

It should be noted that, unlike softkeys and input collections, the order of the information lines 1903 on a screen is very important because this order determines the layout of the screen.

To delete an information line, the developer moves the mouse pointer to the information line 1903 that is to be deleted, and clicks on the right mouse button to bring up the pop-up menu whose choices include "Delete Row" and Insert Row". Selecting "Delete Row" causes a Delete Row dialog box to appear with the primary and secondary column information of the information line to be deleted. Clicking "Yes" will confirm the deletion, and clicking "No" will cancel it.

Title/Prompt

Title or prompt 1917 is the very first line of the Screen Edit window 1901, and acts as a heading for the screen. This title or prompt corresponds to the Information Position Line (Global Prompt) defined by ADSI. The primary and secondary columns of the title, if any, are shown in double quotes.

Specifying a Title/Prompt

Figures 21A, 21B:
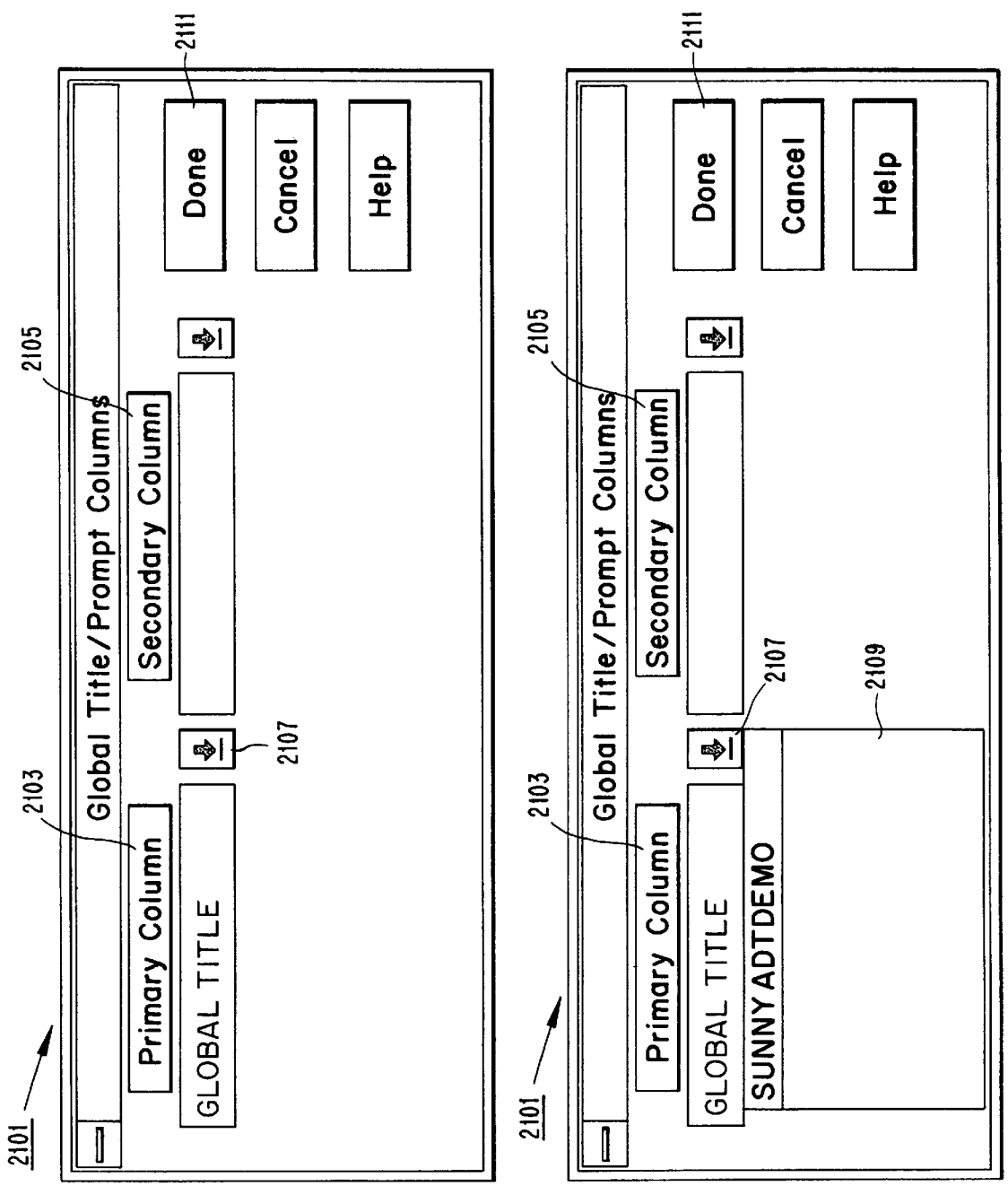
Figure 22:
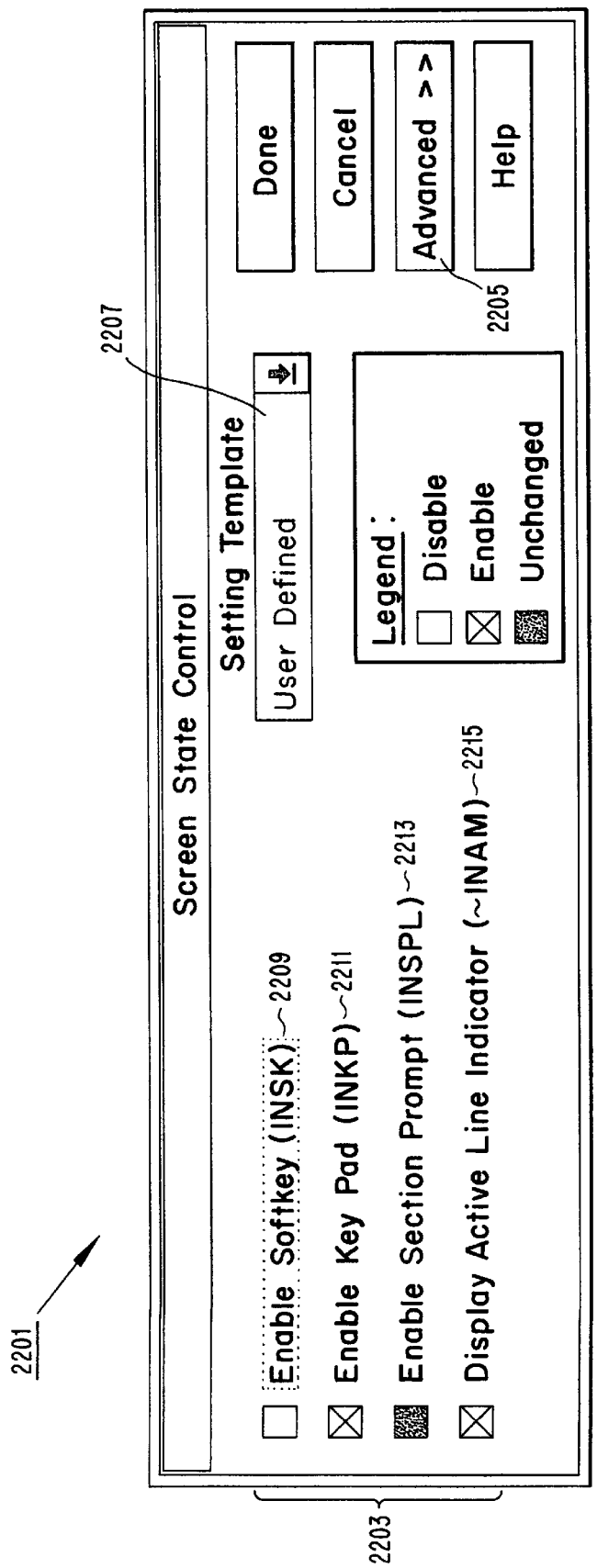
Figure 23:
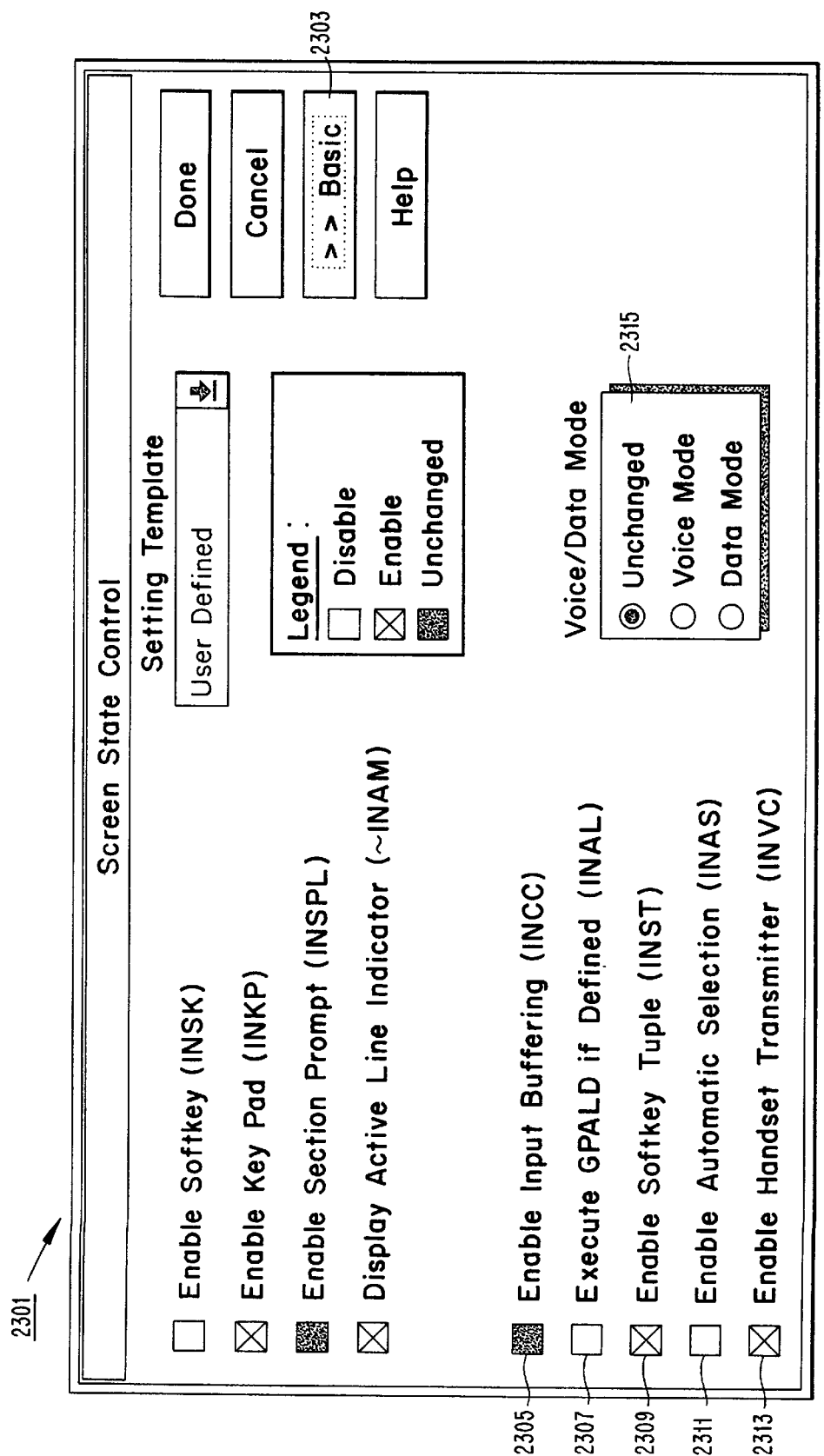

To specify a title or prompt, the developer double clicks on the title area 1917, which causes the Global Title/Prompt Columns dialog box 2101 to be displayed, as shown in FIG. 21A. The developer can click and type a new prompt on the primary and/or secondary columns 2103, 2105. Alternatively, the developer can use a prompt that was previously specified. A drop-down list box 2109 (FIG. 21B) can be opened by clicking on the down arrow 2107 to the right of the column and then select a prompt from the list.

By clicking Done 2111 when finished, the new prompt will display in the title area 1917 of the Screen Edit window 1901 and the status 1919 is set to a default value of "Use This Title". For more details on the prompt status, see the sub-section below.

Controlling the Status of a Title/Prompt

To change the status of the prompt for the current screen, click on the status area 1919. A drop down list box show a list of valid status, including "Disabled", "Use This Title", "Use Previous Title" and "Unchanged". These status states will now be described.

Disabled

The "Disabled" status should be chosen if the prompt is not to appear on the CPE screen. This will simply set the title prompt status to disable without clearing the prompt that was previously sent to the CPE, if any. The same prompt can later be used by re-enabling the prompt without having to send the same prompt again.

Use This Title

The "Use This Title" status should be chosen if the title previously sent to the CPE should be replaced with the one defined in the title area 1917 of the Screen Edit window 1901. The state of the title is also set to be enabled. If the title is not defined, an empty title is sent which in effect clears the title in the CPE. This is the default status if you have just defined a new title prompt.

Use Previous Title

The "Use Previous Title" status should be chosen if the last title previously sent to the CPE should be used without defining a new title. The title that is defined in this Screen Edit window 1901 will not be used. One has to choose "Use This Title" in order to use the title defined in this Screen Edit window 1901. If a title was previously sent to the CPE but was disabled in the previous screen, it will be re-enabled.

Unchanged

The "Unchanged" status should be chosen no changes are to be made to either the enable/disable state or the content of the title prompt 1917. If a title is defined in the first screen of the application and all subsequent screens share the same title, this status should be used for all the subsequent screens.

Deleting a Title/Prompt

If the title is not to be displayed for the current screen, it can either be deleted from the CPE or simply have its status set to disabled. To delete the title prompt from the CPE, set the primary and secondary columns of the prompt to empty and then set the status 1919 to "Use This Title". This will remove any previous title prompt from the CPE memory.

Alternatively, the status area 1919 can be set to "Disabled" without removing the prompt from the CPE memory. When "Disabled", the prompt for the current Screen Edit window 1901 will not be displayed. The benefit of this approach is that if it is desired to use this prompt for any subsequent screens, one needs only to set the status area 1919 to "Use Previous Title" without having to resend the prompt again.

Control Area

The control area 1921 of the Screen Edit window 1901 provides controls of screen status 1923, screen format 1925, and screen softkey type 1927.

Screen Status Control

Screen status control is used to control the state of the CPE when a screen is displayed on the CPE screen 111. To access the screen status control for the current screen, click on the Screen button 1923 in the control area 1921. This causes the Screen State Control dialog box 2201 to be displayed. Each state control setting has three possible states: Disable, Enable and Unchanged. Click on the check box next to the state controls 2203 to change the state. Continue clicking on the check box to cycle through the three states.

Disable State

The state control setting is set to disable for this screen.

Enable State

The state control setting is set to enable for this screen.

Unchanged State

The state control setting is not changed for this screen. The state value last set by another screen is used.

Basic Screen State Control

The screen State Control dialog box 2201 that is displayed when first accessed shows only the basic control functions. Click "Advanced" 2205 for advanced control functions.

The setting that is shown when the State Control dialog box 2201 is first displayed is user-defined by a Setting Template drop-down list box that is accessed by clicking on the "User Defined" button 2207. There are a number of built-in settings for the most common type of screens. The developer can select one of these settings depending on the type of screen being specified. Changes can be made to the setting after a built-in setting has been selected. When this dialog box is exited, this setting will be saved and shown as user-defined the next time it is opened. The built-in settings remain unchanged.

Built-in Settings

In the exemplary embodiment, there are four built-in settings in addition to the user defined settings. These are:

Default

This setting sets all fields to the default values as specified in Bellcore TR-NWT-001273.

Input Mode

This setting is to be used during input collection.

Information Screen

This setting is intended to be used for screens that contain information only.

Item List Screen

This setting is intended to be used for screens with list items, that is, items that the users can select.

All Unchanged

This setting is used to set all the settings to the unchanged states.

The following fields are part of the basic control function. Refer to the Information parameter of Bellcore TR-NWT-001273 for further details.

Enable Softkey (INSK) Field 2209

Controls whether softkeys should be enabled when the screen is displayed.

Enable Key Pad (INKP) Field 2211

Controls whether the CPE key pad and keyboard, if any, should be enabled when the screen is displayed.

Enable Section Prompt (INSPL) Screen Field 2213

Controls whether the screen section prompt should be enabled. Therefore, make the first information line in the Screen Edit window a title, in addition to the global title.

Display Active Line Indicator (-INAM) Field 2215

Controls whether the active line indicator should be visible. Remember that if this field is unchecked, the active line indicator will be invisible, so the developer should make sure that all softkeys for the screen are identified. Otherwise, this check box defaults to checked.

Advanced Screen State Control

Clicking the "Advanced" button 2205 will display the advanced screen state control window 2301. The advanced screen state control window 2301 differs from the basic screen state control window 2201 in that the Advanced button 2205 is replaced by a Basic button 2303, and in that the following additional fields are presented to the developer:

Enable Input Buffering (INCC) Field 2305

Controls whether the CPE should buffer user input first. This state setting may be overwritten by the input overlay if input overlay is used in this screen. In other words, this setting is in effect only for a screen that does not use any input collections.

Execute GPALD if Defined (INAL) Field 2307

Controls whether the execution of the general purpose active line definer (GPALD), if such a definer is defined, should be enabled.

Enable Softkey Tuple (INST) Field 2309

Controls whether the softkey tuple for the active line should be enabled.

Enable Automatic Selection (INAS) Field 2311

Controls whether the automatic selection mode for the CPE should be enabled.

Enable Handset Transmitter (INVC) Field 2313

Controls whether the CPE handset to voice path transmitter should be enabled.

Voice/Data Mode Control 2315

Clicking on the appropriate radio button allows the developer to choose the desired mode (voice or data). The developer should click on the Unchanged setting if it is not desired to change the mode for the current screen.

Format Control

Figure 24:
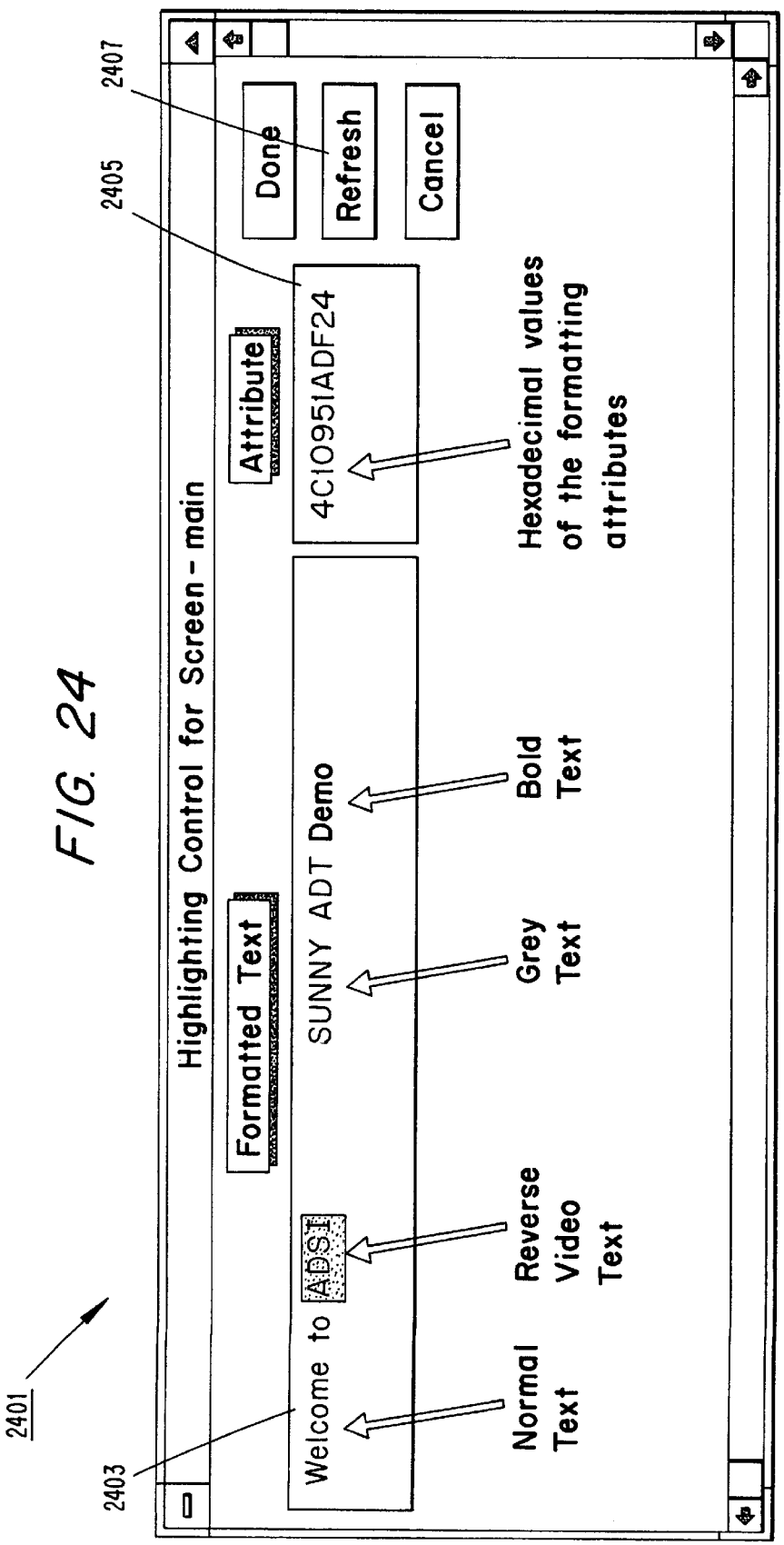

The format control controls the formatting attributes for the information line. The four type of formats supported by ADSI are Normal (N), Reverse Video (R), Gray (G), and Bold (B). To specify a format, the developer clicks on the Format Button 1925 in the control area 1921 of the Screen Edit window 1901. This causes a Highlighting Control window 2401 to be displayed (FIG. 24). When the Highlighting Control window 2401 is displayed, the associated Screen Edit window 1901 is disabled and minimized. When the developer finishes editing the formatting attributes and closes the Highlighting Control window 2401, the state of the Screen Edit window 1901 will be restored.

The Highlighting Control window 2401 provides a What-You-See-Is-What-You-Get (WYSIWYG) attribute formatting environment. The formatted information lines are shown in the Formatted Text area 2403. The corresponding formatting attributes in hexadecimal values are shown in an Attribute area 2405. The Highlighting Control window 2401 can be in one of two modes: viewing mode or formatting mode. In viewing mode, the information lines are shown in WYSIWYG format. In formatting mode, an information line is shown in underscored format. Only one line at a time can be placed into formatting mode.

Formatting Text

Figure 25A:
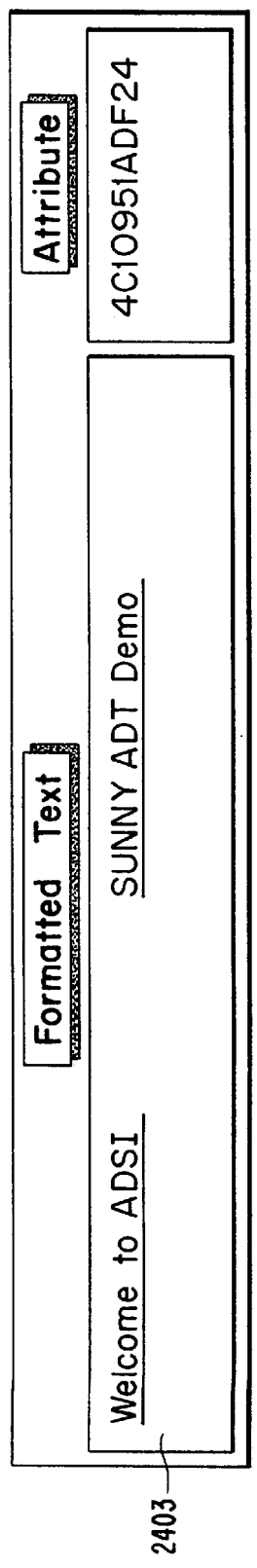
Figure 25B:
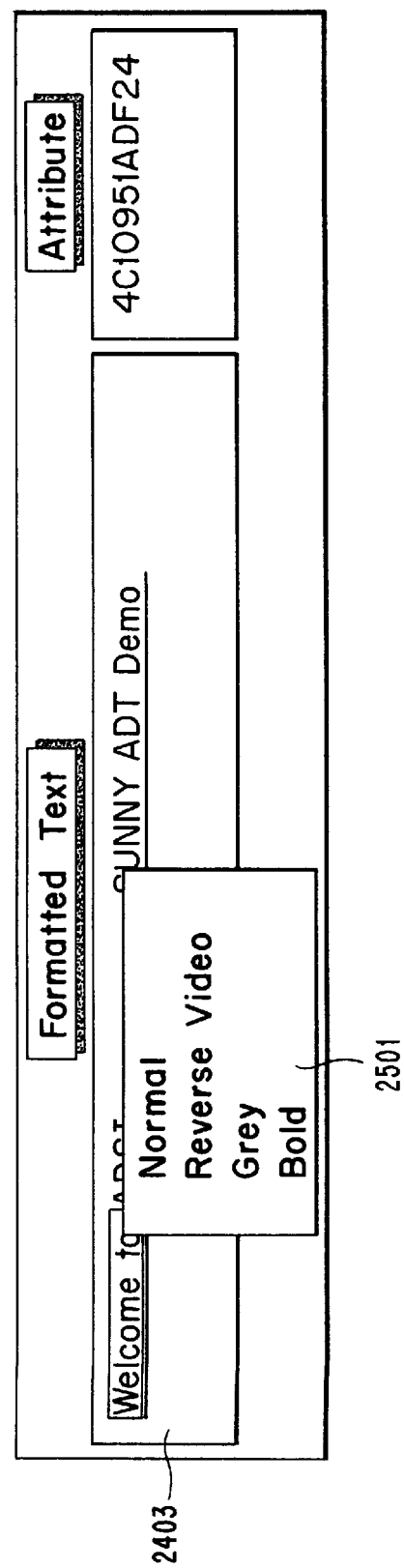

To format an information line, click on any text of the information to enter the formatting mode. The formatting mode is illustrated in FIG. 25A.

In formatting mode, the formatted text is temporarily hidden and the information line is displayed in underscored format. To format the text, the developer first highlights the text, and then presses the right mouse button. A pop-up menu 2501 appears showing the four formatting modes. The desired formatting mode should be selected. This causes the information line to return to viewing mode (FIG. 24) with the new formatted text. The Attribute area 2405 is updated accordingly.

To return to the viewing mode without formatting any text, the developer may click on the Refresh button 2407.

Attribute Area 2405

The Attribute area 2405 is an editable area and is intended for expert users who have in-depth knowledge regarding how to format text using the hexadecimal representation. These hexadecimal values follow the specifications defined in Bellcore TA-NWT-001273. The developer is cautioned not to edit the Attribute area 2405 without being familiar with the hexadecimal representation of the formatting attributes. Instead, the Formatted Text area 2403 should be used to format the information lines.

The hexadecimal values are represented by two characters each. Existing attributes can be modified, or new attributes can be inserted. Also, attributes of one information line can be copied and pasted to another information line. The developer may need to click and drag to highlight and therefore scroll to see the rest of the attribute if it is too long.

When done editing the attribute, the developer should make sure to click the Refresh button 2407 to see the effect of the changes.

Softkey Type Control 1927

Softkeys can be specified for each information line or for the whole screen. Please see the Information Line Softkeys sub-section for further details.

Information Line Softkeys

The bottom portion of the Screen Edit window 1901 is used for specifying softkeys for the information lines. Different softkeys can be specified for each information line or, alternatively, uniform softkeys can be specified for the whole screen. Reference should be made to the Initialize Soft key Line parameter, Load Default Soft Key Tuple parameter, and Load Virtual Display parameter of Bellcore TR-NWT-001273 for further details on how to use softkeys on a screen.

Project Softkey List

On the right side of the softkey area is a list of existing project softkeys (i.e., the project softkey list 1929). Every time a Screen Edit window 1901 is open, the project softkey list 1929 is updated with the latest project softkeys. If any project softkeys are added or deleted while a Screen Edit window 1901 is open, the developer, when returning to the Screen Edit window 1901, should click on the Update Softkey List button 1931 in order to refresh the project softkey list 1929. The developer should make sure to save changes to softkeys before returning to the Screen Edit window 1901.

Softkeys from the project softkey list 1929 are used to populate the information line and screen softkeys. The Null softkey is always the first softkey in the project softkey list 1929. The most typical use of the Null softkey is for information lines that have no individual softkeys associated with the lines but which do not want to use the default softkey. The Null softkey is not necessary for positioning softkeys. The developer can simply leave those softkeys empty.

To select a softkey for the project softkey list 1929, the left mouse button should be clicked and released when the mouse pointer is over the softkey name. As a result, a drag icon appears indicating that the drag and drop mode is active and the selected softkey is ready to be dropped into the destination.

Specifying Softkeys for Each Information Line

To specify softkeys for each information line so that each line has different softkeys, the developer clicks and selects the Individual Line radio button of the Softkey Specified for group 1927, if it is not already selected.

Figure 26:
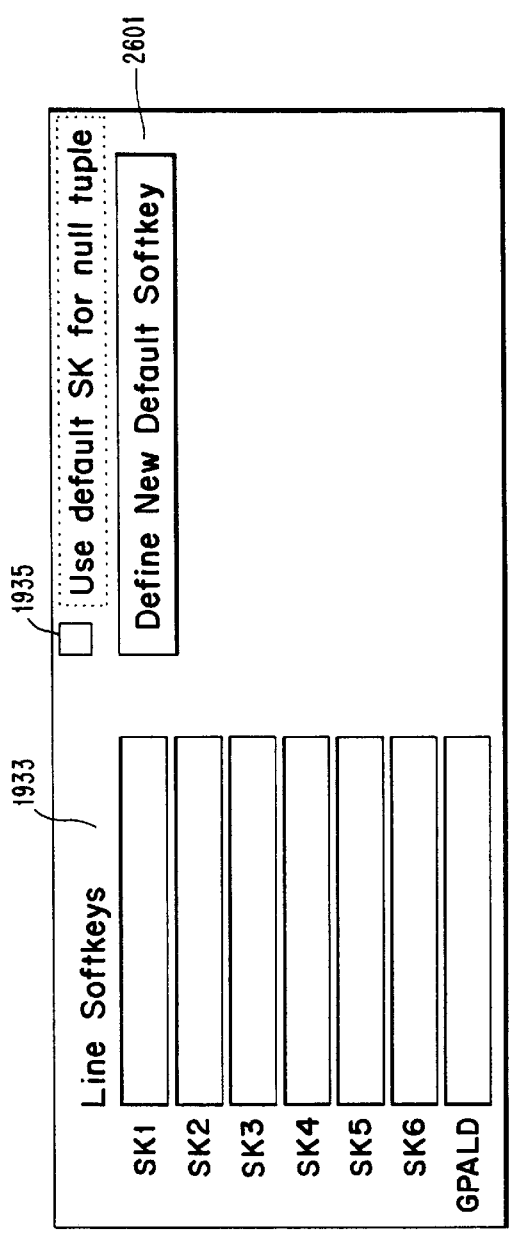

When the Individual Line radio button is selected, the Line Softkeys list box 1933, Boundary Softkeys list box 1935, and default softkey check box 1935 and button 2601 appear (FIG. 26).

The Line Softkeys list box 1933 lists the six displayable softkeys and the General Purpose Active Line Definer (GPALD) softkey.

Figure 27:
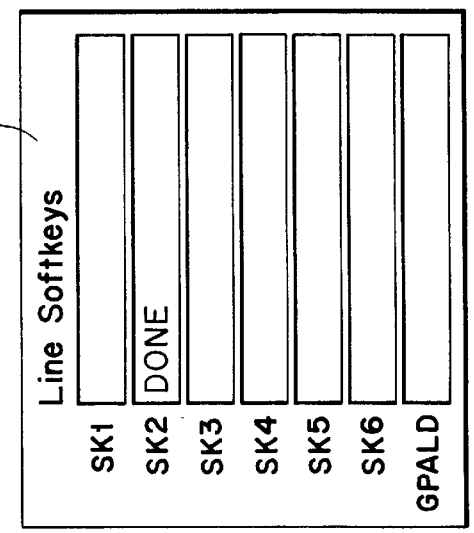

To add a softkey to the line is list box, the developer drags a softkey name from the Project Softkey List 1929 and drops it into the desired position in the Line Softkeys list box 1933. Alternatively, the developer can click and type the softkey name directly into the Line Softkeys list box 1933. A softkey can be added anywhere in the Line Softkeys list box 1933 without having to specify all prior softkeys. For example, FIG. 27 shows a Line Softkeys list box 1933 having only one softkey in position SK2. As a result, the development tool 209 will automatically insert a Null softkey position holder in position SK1 during integration.

To delete a softkey from the Line Softkeys list box 1933, the developer highlights the softkey Name and deletes it.

Specifying Default Softkey for Null Tuple

If the majority of the lines of a screen have identical displayable softkeys, the developer may want to leave the six displayable softkeys in the Line Softkey list box 1933 for these lines empty and then use the default softkey function to specify softkeys instead. For information lines with all six displayable softkeys, that is, SK1 to SK6 are empty, the default softkeys will be used for these information lines assuming the default softkeys are defined and enabled. For instance, if one has a screen of ten lines with two lines having the same softkeys and the remaining eight lines having displayable softkeys that are the same for the eight lines but different from the first-mentioned two lines, the six displayable softkeys for the eight lines should be left empty in the Line Softkeys list box. Those softkeys should be specified once using the Default Softkey list box 1937 and then enable the default softkey by checking the Use Default SK for Null Tuple check box 1935.

If the developer does not want the information line with null tuple to use the default softkeys, a Null softkey should be dropped into position SK1 of the Line Softkeys list box 1933.

Figure 28:
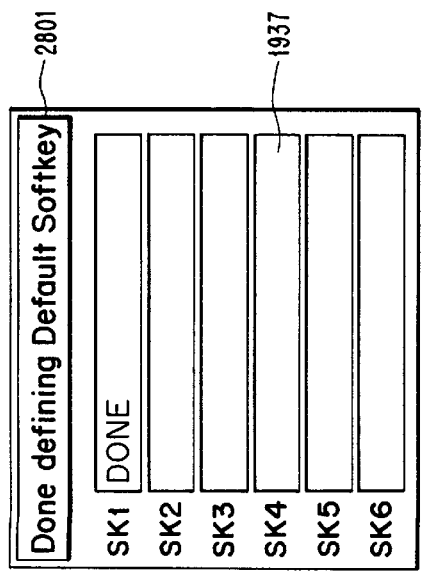

To specify the default softkey for null tuple, first make sure the Individual Line radio button is selected in the Softkey Type Control area 1927, and then click on the Define New Default softkey button 2601 if the Default Softkey list box 1937 is not already displayed. When the Default softkey list box 1937 displays, the Define New Default softkey button changes into a Done Defining Default Softkey button 2801 (see FIG. 28). The softkey names can then be dragged and dropped from the Project Softkey List window 1929 into the Default softkey list box 1937.

To close the Default Softkey list box 1937, the developer clicks on the Done Defining Default softkey button 2801. The Default softkey list box 1937 will be closed and the button changed to Define New Default Softkey. The developer should remember to enable the default softkey tuple. After Default Softkeys are defined, they need to be enabled by checking the Use Default SK for Null Tuple check box 1935.

Specifying Boundary Softkeys

Boundary Softkeys are applicable only to the top and bottom lines of the screen. Refer to the Load Virtual Display parameter in Bellcore TR-NWT-001283 for further details.

To specify the boundary softkeys, the developer drags a softkey name from the Project Softkey List window 1929 and drops it into the desired position in the Boundary Softkeys list box 1939. Alternatively, the developer can click and type the softkey name directly into the Boundary Softkeys list box 1939.

Specifying Softkeys for the Whole Screen

Figure 29:
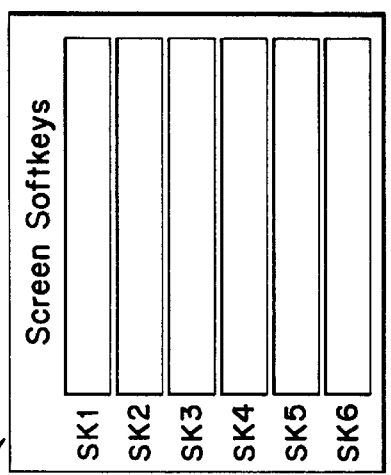

To specify softkeys for the whole screen so that each line has the same softkeys, click and select the Whole Screen radio button in the Softkey Type Control area 1927, if it is not already selected. This will cause a Screen Softkeys list box 2901 (FIG. 29) to appear, and the Line Softkeys list box 1933, default softkey check box 1935 and Define New Default Softkey button 2601 to disappear.

The Screen Softkeys list box 2901 lists the six displayable softkeys. To add a softkey to the Screen Softkeys list box 2901, drag a softkey name from the Project Softkey List window 1929 and drop it into the desired position in the Screen Softkeys list box 2901. Alternatively, the developer can click and type the softkey name directly into the Screen Softkeys list box 2901.

Saving Changes to Screen Edit Window

The developer can save any changes made to the Screen Edit window 1901 by clicking on the Save button 1125 on the toolbar 1105 or by selecting Save from the File menu 1123. Make sure the Screen Edit window 1901 is the active window when saving changes.

Exiting the Screen Edit Window

Figure 30:
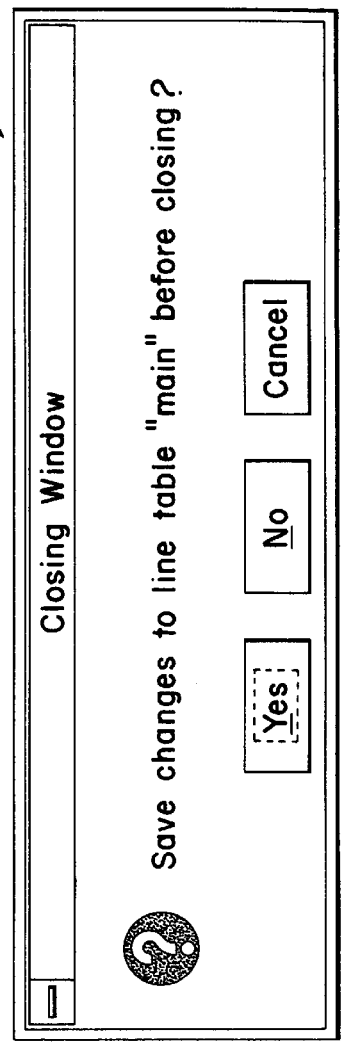

To exit the Screen Edit window 1901, double click on the control menu of the window or select Close from the File menu 1123. If any changes have been made to any of the screen information, a Closing Window dialog box 3001 (FIG. 30) displays along with the name of the screen. Clicking on "Yes" will save and then exit. Clicking on "No" will exit without saving changes. Clicking on "Cancel" will return to the Screen Edit window 1901 without saving changes or exiting.

The invention fills a need to provide a fast and easy ADSI-optimized development environment that can be used by any third party user/programmer. It requires only a PC or a network of PCs rather than the use of an existing AIN development environment on a SCN or a switching system.

The invention has been described with reference to a particular embodiment. However, it will be readily apparent to those skilled in the art that it is possible to embody the invention in specific forms other than those of the preferred embodiment described above. This may be done without departing from the spirit of the invention. Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A development tool for generating a set of server control signals for controlling a server that provides a service to an expanded capability telephone via a telephone network, wherein the service comprises an exchange of signals with the expanded capability telephone, the development tool comprising:

means for generating a set of graphical interfaces for displaying current service parameters to a developer, and for receiving new values of the service parameters from the developer;

a dynamic set of objects, each possessing predefined properties and exhibiting predefined behavior, whereby the set of objects defines the functionality of the development tool;

means for modifying the set of objects in real time in accordance with the new values of the service parameters; and means for generating the set of server control signals as a function of the modified set of objects.

2. The development tool of claim 1, wherein:

the server comprises a script interpreter and a runtime engine, wherein the script interpreter converts a script file into runtime control signals for controlling the runtime engine, and wherein the runtime engine, under direction of the runtime control signals, provides the service to the expanded capability telephone; and the set of server control signals is the script file for controlling the script interpreter.

3. The development tool of claim 2, wherein:

the expanded capability telephone is an Analog Display Services Interface (ADSI)-compatible telephone; and the exchange of signals is in accordance with an ADSI protocol.

4. The development tool of claim 1, wherein the modifying means comprises:

means for modifying a first one of the objects in accordance with the new values of the service parameters;

means for channeling information from the first one of the objects to another one or more of the objects in response to the first one of the objects being modified in accordance with the new values of the service parameters.

5. The development tool of claim 1, wherein:

the expanded capability telephone is an Analog Display Services Interface (ADSI)-compatible telephone; and the exchange of signals is in accordance with an ADSI protocol.

6. The development tool of claim 1, wherein the means for generating the set of graphical interfaces, the set of objects, the means for modifying the set of objects and the means for generating the set of server control signals are implemented on a stand-alone programmable processor.

7. The development tool of claim 1, wherein the objects include data objects and voice objects.

8. A development system for generating an automated server application program, comprising:

a server, responsive to a set of server control signals, for providing a service to an expanded capability telephone via a telephone network, wherein the service comprises an exchange of signals with the expanded capability telephone; and a development tool for generating the set of server control signals, the development tool comprising:

means for generating a set of graphical interfaces for displaying current service parameters to a developer, and for receiving new values of the service parameters from the developer;

a dynamic set of objects, each possessing predefined properties and exhibiting predefined behavior, whereby the set of objects defines the functionality of the development tool;

means for modifying the set of objects in accordance with the new values of the service parameters; and means for generating the set of server control signals as a function of the modified set of objects.

9. The development system of claim 8, wherein:

the server comprises a script interpreter and a runtime engine, wherein the script interpreter converts a script file into runtime control signals for controlling the runtime engine, and wherein the runtime engine, under direction of the runtime control signals, provides the service to the expanded capability telephone; and the set of server control signals is the script file for controlling the script interpreter.

10. The development system of claim 9, wherein:

the expanded capability telephone is an Analog Display Services Interface (ADSI)-compatible telephone; and the exchange of signals is in accordance with an ADSI protocol.

11. The development system of claim 8, wherein the modifying means comprises:

means for modifying a first one of the objects in accordance with the new values of the service parameters;

means for channeling information from the first one of the objects to another one or more of the objects in response to the first one of the objects being modified in accordance with the new values of the service parameters.

12. The development system of claim 8, wherein:

the expanded capability telephone is an Analog Display Services Interface (ADSI)-compatible telephone; and the exchange of signals is in accordance with an ADSI protocol.

13. The development system of claim 8, wherein the server and the development tool are implemented on a stand-alone programmable processor.

14. The development system of claim 8, wherein the server and the development tool are implemented on a programmable processor that is connected with other processors by means of a network.

15. The development system of claim 8, wherein the objects include data objects and voice objects.

16. A method for generating a set of server control signals for controlling a server that provides a service to an expanded capability telephone via a telephone network, wherein the service comprises an exchange of signals with the expanded capability telephone, the method comprising the steps of:

displaying current service parameters to a developer;

receiving new values of the service parameters from the developer;

providing a dynamic set of objects, each possessing predefined properties and exhibiting predefined behavior, whereby the set of objects defines the functionality of the development tool;

modifying the set of objects in real time in accordance with the new values of the service parameters; and generating the set of server control signals as a function of the modified set of objects.

17. The method of claim 16, wherein:

the server comprises a script interpreter and a runtime engine, wherein the script interpreter converts a script file into runtime control signals for controlling the runtime engine, and wherein the runtime engine, under direction of the runtime control signals, provides the service to the expanded capability telephone; and the step of generating the set of server control signals comprises generating the script file for controlling the script interpreter as a function of the modified set of objects.

18. The method of claim 17, wherein:

the expanded capability telephone is an Analog Display Services Interface (ADSI)-compatible telephone; and the exchange of signals is in accordance with an ADSI protocol.

19. The method of claim 16, wherein the step of modifying the set of objects comprises the steps of:

modifying a first one of the objects in accordance with the new values of the service parameters; and channeling information from the first one of the objects to another one or more of the objects in response to the first one of the objects being modified in accordance with the new values of the service parameters.

20. The method of claim 16, wherein:

the expanded capability telephone is an Analog Display Services Interface (ADSI)-compatible telephone; and the exchange of signals is in accordance with an ADSI protocol.

21. The method of claim 16, wherein the objects include data objects and voice objects.

22. An article of manufacture comprising:

a computer usable medium having computer readable program code means embodied therein for causing a computer to effect a development tool that generates a set of server control signals for controlling a server that provides a service to an expanded capability telephone via a telephone network, wherein the service comprises an exchange of signals with the expanded capability telephone, the computer readable program code means in said article of manufacture comprising:

computer readable program code means for causing the computer to display current service parameters to a developer;

computer readable program code means for causing the computer to receive new values of the service parameters from the developer;

computer readable program code means for causing the computer to generate a dynamic set of objects, each possessing predefined properties and exhibiting predefined behavior, whereby the set of objects defines the functionality of the development tool;

computer readable program code means for causing the computer to modify the set of objects in accordance with the new values of the service parameters; and computer readable program code means for causing the computer to generate the set of server control signals as a function of the modified set of objects.

23. The article of manufacture of claim 22, wherein:

the server comprises a script interpreter and a runtime engine, wherein the script interpreter converts a script file into runtime control signals for controlling the runtime engine, and wherein the runtime engine, under direction of the runtime control signals, provides the service to the expanded capability telephone; and the computer readable program code means for causing the computer to generate the set of server control signals comprises computer readable program code means for causing the computer to generate the script file for controlling the script interpreter as a function of the modified set of objects.

24. The article of manufacture of claim 23, wherein:

the expanded capability telephone is an Analog Display Services Interface (ADSI)-compatible telephone; and the exchange of signals is in accordance with an ADSI protocol.

25. The article of manufacture of claim 22, wherein the computer readable program code means for causing the computer to modify the set of objects comprises:

computer readable program code means for causing the computer to modify a first one of the objects in accordance with the new values of the service parameters; and computer readable program code means for causing the computer to channel information from the first one of the objects to another one or more of the objects in response to the first one of the objects being modified in accordance with the new values of the service parameters.

26. The article of manufacture of claim 22, wherein:

the expanded capability telephone is an Analog Display Services Interface (ADSI)-compatible telephone; and the exchange of signals is in accordance with an ADSI protocol.

27. The article of manufacture of claim 22, wherein the objects include data objects and voice objects.

* * * * *